United States Patent
Bai et al.

(10) Patent No.: US 12,207,307 B2
(45) Date of Patent: Jan. 21, 2025

(54) RANDOM ACCESS CHANNEL PROCEDURE FOR MULTIPLE TRANSMIT-RECEIVE POINTS

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 17/500,344

(22) Filed: Oct. 13, 2021

(65) Prior Publication Data

US 2022/0141881 A1     May 5, 2022

Related U.S. Application Data

(60) Provisional application No. 63/110,099, filed on Nov. 5, 2020.

(51) Int. Cl.
    *H04W 74/0833*  (2024.01)
    *H04W 56/00*    (2009.01)

(52) U.S. Cl.
    CPC ... *H04W 74/0833* (2013.01); *H04W 56/0015* (2013.01)

(58) Field of Classification Search
    CPC .................. H04W 74/0833; H04W 56/0015
    See application file for complete search history.

(56) References Cited

U.S. PATENT DOCUMENTS

| | | | | |
|---|---|---|---|---|
| 2019/0110242 A1* | 4/2019 | Islam | .................. | H04W 48/06 |
| 2019/0159258 A1* | 5/2019 | Islam | .................. | H04L 5/0005 |
| 2019/0297648 A1* | 9/2019 | Nagaraja | ............... | H04B 7/063 |
| 2020/0100297 A1* | 3/2020 | Agiwal | ............... | H04B 17/318 |
| 2021/0105780 A1* | 4/2021 | Jin | .................... | H04W 72/1273 |
| 2021/0204346 A1* | 7/2021 | Ye | ............................ | H04B 7/00 |

(Continued)

OTHER PUBLICATIONS

Liu et al., "Initial Access, Mobility, and User-Centric Multi-Beam Operation in 5G New Radio", Mar. 2018, IEEE Communications Magazine, p. 35-41, total 7 pages. (Year: 2018).*

(Continued)

*Primary Examiner* — Michael A Keller
*Assistant Examiner* — Chhian (Amy) Ling
(74) *Attorney, Agent, or Firm* — Holland & Hart LLP

(57) ABSTRACT

Methods, systems, and devices for wireless communication are described. A device, such as a user equipment (UE) may receive a set of synchronization signal blocks (SSBs) from multiple transmit-receive points (mTRPs). The set of SSB may include a first subset of SSBs associated with a first TRP and a second subset of SSBs associated with a second TRP. Each SSB may correspond to a respective directional beam (e.g., a transmit beam, a receive beam). The UE may transmit, to a base station, an indication of a selected first SSB from the first subset of SSBs associated with the first TRP and a selected second SSB from the second subset of SSBs associated with the second TRP. The UE may perform a random access channel procedure with the base station, the first TRP, the second TRP, or a combination thereof based on the transmitted indication.

30 Claims, 16 Drawing Sheets

(56) References Cited

U.S. PATENT DOCUMENTS

| | | | |
|---|---|---|---|
| 2022/0022233 A1* | 1/2022 | Lee | H04L 1/0025 |
| 2022/0046458 A1* | 2/2022 | Zhu | H04L 5/0048 |
| 2022/0330345 A1* | 10/2022 | Mangalvedhe | H04W 74/002 |
| 2023/0113940 A1* | 4/2023 | Matsumura | H04L 5/0051 |
| | | | 370/329 |
| 2023/0188180 A1* | 6/2023 | Nilsson | H04B 7/024 |
| | | | 370/329 |

OTHER PUBLICATIONS

Samsung, "Support of Multiple Beam Indication for Multiple TRPs", 3GPP TSG RAN WG2 Meeting #107, Aug. 24-30, 2019, R2-1911359, 4 Pages. (Year: 2019).*

Samsung, "MAC CE design for support of multiple beam indication for multiple TRPs", 3GPP TSG RAN WG2 Meeting #107, Aug. 24-30, 2019, R2-1911360, 7 Pages. (Year: 2019).*

* cited by examiner

RANDOM ACCESS CHANNEL PROCEDURE FOR MULTIPLE TRANSMIT-RECEIVE POINTS

CROSS REFERENCE

The present application for patent claims the benefit of U.S. Provisional Patent Application No. 63/110,099 by BAI et al., entitled "A RANDOM ACCESS CHANNEL PROCEDURE FOR MULTIPLE TRANSMIT-RECEIVE POINTS," filed Nov. 5, 2020, assigned to the assignee hereof, and expressly incorporated by reference herein.

FIELD OF TECHNOLOGY

The following relates to wireless communication, including a random access channel procedure for multiple transmit-receive points (mTRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may be configured to support beamformed communications via directional beams. For example, the UE may be configured with multiple antenna panels to support the beamformed communications. The UE may, in some cases, be capable of communicating with multiple transmit-receive points (mTRPs) (e.g., access points, base stations, and the like), which may improve the reliability of the beamformed communications at the UE. For example, the UE may be configured to receive from and transmit to beamformed communications from and to mTRPs. Beamformed communications via mTRPs may improve spatial diversity against blockages in wireless communication systems.

SUMMARY

Various aspects of the present disclosure relate to configuring a communication device, such as a UE and a base station (e.g., an eNB, a gNB) in a wireless communications system to support techniques for a random access channel procedure for mTRPs. For example, the communication device may be configured to receive a set of synchronization signal blocks (SSBs) from mTRPs. The communication device may, in some examples, be configured to distinguish which SSBs are from which TRP such that it can perform random access procedures with the different TRPs. The communication device may be configured to transmit a report including an indication of preferred SSBs for each TRP. After reporting the preferred SSBs (e.g., preferred directional beams) for each TRP, the UE may be perform wireless communications (e.g., downlink reception, uplink transmission) with the mTRPs. By performing random access procedures with the mTRPs in accordance with the described techniques, the communication device may experience greater power savings, higher reliability, and lower latency, among other benefits.

DETAILED DESCRIPTION

Figure 1:
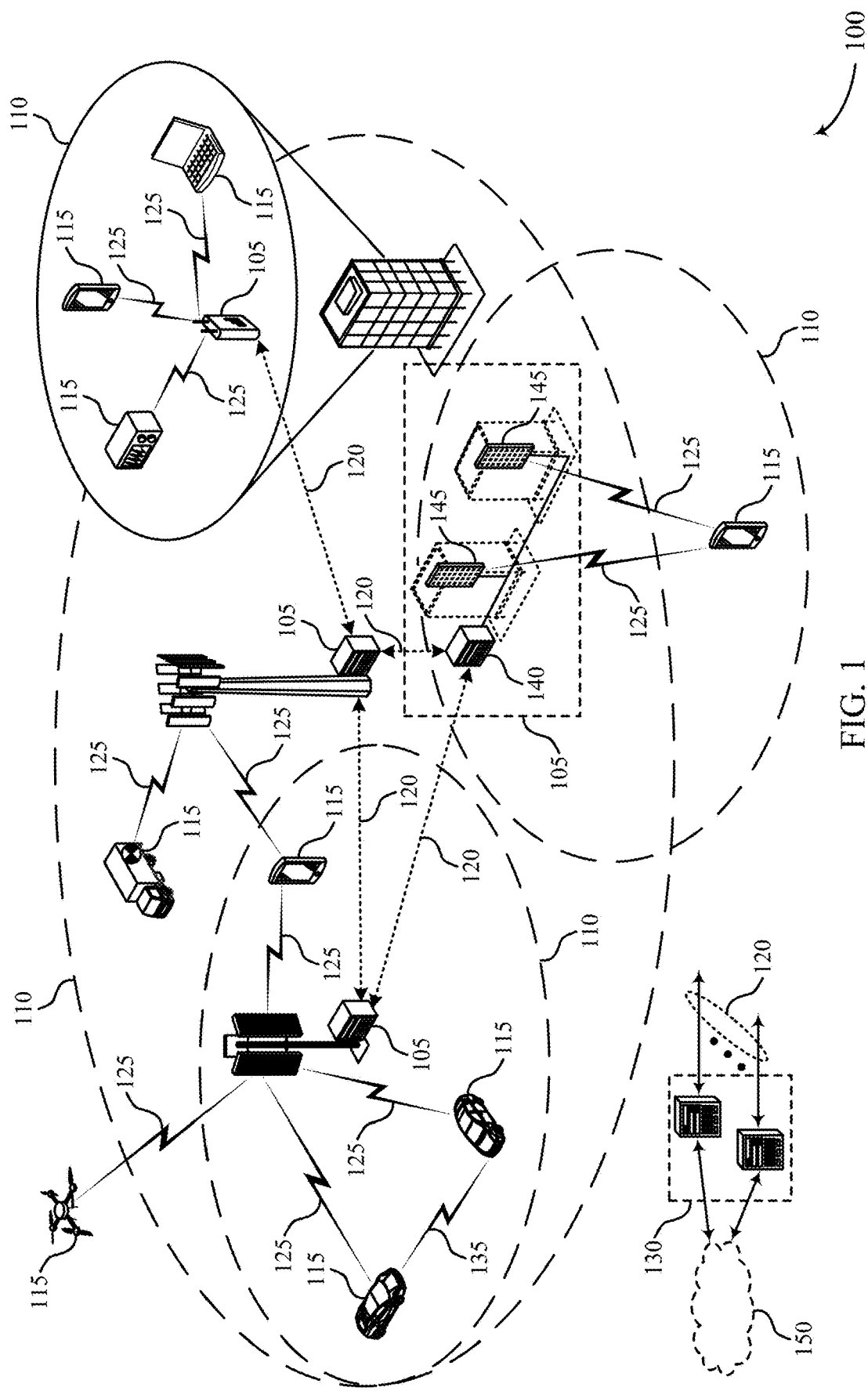
FIGS. 1 and 2 illustrate examples of wireless communications systems that support a random access channel procedure for mTRPs in accordance with aspects of the present disclosure.

A wireless communications system may include communication devices, such as a UE and a base station (e.g., an eNB, a gNB, or some other base station), that support wireless communications over one or multiple radio access technologies. Examples of radio access technologies include 4G systems, such as LTE systems, and 5G systems, which may be referred to as NR systems. In some wireless communications systems, communication devices may support directional communications (also referred to as beamforming communications). A UE and a base station or other communication devices (e.g., other access nodes, base stations) may establish a connection or re-establish a connection using a random access procedure. The random access procedure may include a series of handshake messages carrying information that facilitates establishing the connection between the UE and the base station or the other communication devices (e.g., other access nodes, base stations).

The communication devices may, in some examples, be exposed to one or mTRPs, such as base stations, access nodes, and the like, which may impact the reliability of wireless communications by improving downlink reception and uplink transmission at the communication devices and improving spatial diversity against blockages. A communication device (e.g., a UE) may be configured to perform a random access procedure with the mTRPs. For example, the communication device may be configured to receive a set of synchronization signal blocks (SSBs) from mTRPs. The communication device may, in some examples, be configured to distinguish which SSBs are from which TRP such that the communication device can perform a random access procedure with the different TRPs. The communication device may be configured to transmit a report including an indication of preferred SSBs for each TRP. After reporting the preferred SSBs (e.g., preferred directional beams) for each TRP, the UE may perform wireless communications (e.g., downlink reception, uplink transmission) with the mTRPs.

Particular aspects of the subject matter described in this disclosure may be implemented to realize one or more of the following potential advantages. The techniques employed by a UE may provide benefits and enhancements to the operation of the UE. For example, operations performed by the UE may provide improvements to wireless communications. In some examples, the UE may experience greater power savings by performing random access procedures with an mTRP in accordance with aspects of the present disclosure. The UE may thus include features for improvements to power consumption, spectral efficiency, higher data rates. The described techniques may promote enhanced efficiency for high reliability and low latency wireless communications, among other benefits.

Aspects of the disclosure are initially described in the context of wireless communications systems. Aspects of the disclosure are further illustrated by and described with reference to apparatus diagrams, system diagrams, and flowcharts that relate to a random access channel procedure for mTRPs.

FIG. 1 illustrates an example of a wireless communications system 100 that supports a random access channel procedure for mTRPs in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRP). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, a UE 115 may be configured to support beamformed communications via directional beams. For example, the UE 115 may be configured with multiple antenna panels to support the beamformed communications. The UE may be exposed to mTRPs (e.g., access points, base stations, and the like), which may improve the reliability of the beamformed communications at the UE 115. For example, the UE 115 may be configured to receive from and transmit to beamformed communications from and to mTRPs in different locations. This helps to improve spatial diversity against blockages in the wireless communications system 100. In some cases, the UE 115 might be unable transmit to and receive from mTRPs during an initial access procedure, as well as support random access to the mTRPs.

To enable for improve wireless communications, techniques described herein are directed to random access to mTRP in contention-based random access and contention-free random access. For example, a UE 115 may be configured to receive a set of SSBs from mTRPs during an initial access procedure. The set of SSBs may include a first subset of SSBs associated with a first TRP and a second subset of SSBs associated with a second TRP. Each SSB may correspond to a respective directional beam. The UE 115 may be configured to distinguish which SSBs is from which TRP such that it later can perform the random access channel procedure to the different TRPs. The UE 115 may be configured to transmit an indication to the network (e.g., a base station 105) of the preferred SSBs for each TRP. After reporting to the network the preferred SSBs (e.g., preferred directional beams) for each TRP, the network may transmit an indication to the UE to enable mTRP wireless communications. Alternatively, the UE 115 may be configured to autonomously prepare for the mTRP wireless communications after reporting the preferred SSBs.

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
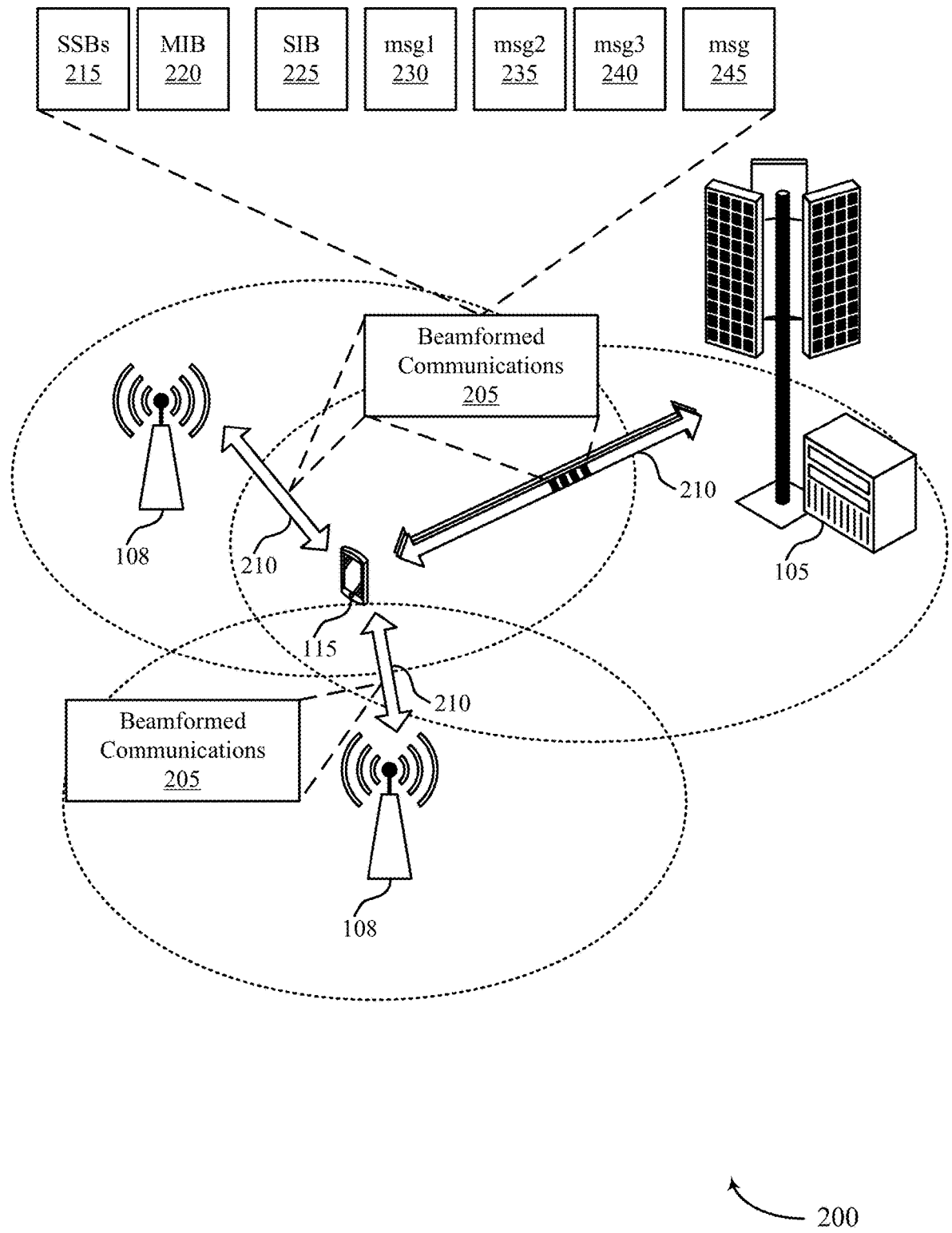

FIG. 2 illustrates an example of a wireless communications system 200 that supports a random access channel procedure for mTRPs in accordance with aspects of the present disclosure. The wireless communications system 200 may implement aspects of the wireless communications system 100. For example, the wireless communications system 200 may include a base station 105, one or more TRPs 108 (e.g., access points, base stations, and the like), and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105, the TRPs 108, and the UE 115 may be configured with multiple antennas, which may be used to employ techniques such as transmit diversity, receive diversity, multiple-input multiple-output communications, or beamforming, or any combination thereof. The antennas of the base station 105, the TRPs 108, and the UE 115 may be located within one or more antenna arrays or antenna panels, which may support multiple-input multiple-output operations or transmit or receive beamforming. For example, the base station 105 or the TRPs 108 antennas or antenna arrays may be co-located at an antenna assembly, such as an antenna tower. In some examples, antennas or antenna arrays associated with the base station 105 or the TRPs 108 may be located in diverse geographic locations.

The base station 105 and the TRPs 108 may have an antenna array with a number of rows and columns of antenna ports that the base station 105 and the TRPs 108 may use to support beamforming of communications with the UE 115. Likewise, the UE 115 may have one or more antenna arrays that may support various multiple-input multiple-output or beamforming operations. Additionally, or alternatively, an antenna panel may support radio frequency beamforming for a signal transmitted via one or more antenna ports. The base station 105, the TRPs 108, and the UE 115 may thus be configured to support beamformed communications 205 using the multiple antennas and over a communication link 210.

Examples of a communication link 210 include a downlink channel or an uplink channels, or a combination thereof. For example, the base station 105 and the TRPs 108 may transmit, and the UE 115 may receive, downlink transmissions on a downlink channel, such as a physical downlink control channel (PDCCH) or a physical downlink shared channel (PDSCH), or a combination thereof. Likewise, the UE 115 may transmit, and the base station 105 and the TRPs 108 may receive, uplink transmissions on an uplink channel, such as a physical uplink control channel (PUCCH) or a physical uplink shared channel (PUSCH), or a combination thereof.

In the example of FIG. 2, the UE 115 may in some cases perform an initial access procedure to find a cell to camp on, receive the necessary system information, and to request a connection through random access. For example, during the initial access, the UE 115 may receive a pair of downlink signals (e.g., a primary synchronization signal (PSS) and a secondary synchronization signal (SSS)) and search, synchronize to, and identify a cell (e.g., a base station 105). In some examples, there is a downlink physical broadcast channel (PBCH) transmitted together with the PSS and the SSS. The PBCH carries a minimum amount of system information including an indication where the remaining broadcast system information is transmitted. In the context of the wireless communications system 200, the PSS, the SSS, and PBCH are jointly referred to as a synchronization signal block (SSB).

Following the initial access, the base station 105 may perform a connection procedure (such as an RRC connection procedure) with the UE 115. For example, the base station 105 and the UE 115 may perform a random access procedure to establish a connection for wired or wireless communication. In some other examples, the base station 105 and the UE 115 may perform a random access procedure to re-establish a connection after a connection failure (such as a radio-link failure) with the base station 105, or to establish a connection for handover to another base station 105, or the like.

The connection procedure (such as random access procedure) between the base station 105 and the UE 115 may correspond to, for example, at least one of the above example radio access technologies. A random access procedure may be referred to as a four-step random access procedure. As part of the four-step random access procedure, base station 105 and UE 115 may transmit one or more messages (handshake messages), such as a first random access message 230 (also referred to herein as msg1), a second random access message 235 (also referred to herein as msg2), a third random access message 240 (also referred to herein as msg3), and a fourth random access message 245 (also referred to herein as msg4), etc.

The UE 115 may initiate the random access procedure by transmitting the first random access message 230, which may include a preamble (also referred to a random access channel preamble, a physical random access channel preamble, or a sequence) that may carry information, such as a UE identifier. The purpose of the preamble transmission may be to provide an indication to the base station 105 presence of a random access attempt, and to allow the base station 105 to determine a delay (such as a timing delay) between the base station 105 and the UE 115. The UE 115 may transmit the first random access message 230 to the base station 105 on a physical random access channel, for example.

The preamble of the first random access message 230 may, in some examples, be defined by a preamble sequence and a cyclic prefix. A preamble sequence may be defined based in part on a Zadoff-Chu sequence. The UE 115 may additionally, or alternatively, use a guard period to handle timing uncertainty of the first random access message 230 transmission. For example, before beginning the random access procedure, the UE 115 may obtain downlink synchronization with the base station 105 based in part on a cell-search procedure. However, because the UE 115 has not yet obtained uplink synchronization with the base station 105, there may be an uncertainty in uplink timing due to the location of the UE 115 in the cell (such as geographic coverage area of base station 105) not being known. In some examples, the uncertainty in uplink timing may be based in part on a dimension (such as a size or area) of the cell. Therefore, including a cyclic prefix to the first random access message 230 may be beneficial, in some examples, for handling the uncertainty in uplink timing.

Per cell, there may be a number of preamble sequences (such as 64 preamble sequences). The UE 115 may select a preamble sequence from a set of sequences in a cell (for example, geographic coverage area of base station 105) based in part on a random selection. In some examples, the UE 115 may select a preamble sequence based in part on an amount of traffic that the UE 115 has for transmission on an uplink shared channel (UL-SCH). From the preamble sequence that the UE 115 selected, the base station 105 may determine the amount of uplink resources to be granted to the UE 115.

Some examples of a random access procedure may be contention-based or contention-free. When performing a contention-based random access procedure, the UE 115 may select a preamble sequence from a set of sequences. That is, as long as other UEs (not shown) are not performing a random access attempt using the same sequence at a same temporal instance, no collisions will occur. As a result, the random access attempt may be detected by the base station 105. If the UE 115 is performing a contention-free random access attempt, for example, for a handover to a new cell, the preamble sequence to use may be explicitly signaled (in control information) by the base station 105. To avoid collisions or interference, the base station 105 may select a contention-free preamble sequence from sequences not associated with the contention-based random access attempt. Alternatively, in contention-based random access, the UE 115 randomly selects a preamble for the first random access message 230 from a pool, and transmit it using at least one uplink beam corresponding to a preferred SSB, as described herein.

Upon receiving the first random access message 230, the base station 105 may respond appropriately with the second random access message 235. For example, the base station 105 may transmit the second random access message 235 to the UE 115 on a downlink shared channel (DL-SCH) or a PDCCH. In some examples, the second random access message 235 may have a same or a different configuration (format) compared to the first random access message 230. The second random access message 235 may carry information for the UE 115, where the information is determined by the base station 105 based in part on information carried in the first random access message 230. For example, the information in the second random access message 235 may include an index of a preamble sequence detected and for which the response is valid, a timing advance parameter determined based in part on the preamble sequence detected, a scheduling grant indicating time and frequency resources for the UE 115 to use for transmission of a next random access message transmission by the UE 115, or a network identifier (such as a random access RNTI (RA-RNTI)) for further communication with the UE 115, or the like.

In some examples, if the base station 105 detects multiple random access attempts (from the UE 115 and other UEs (not shown)), the base station 105 may combine individual response messages of multiple UEs in a single transmission (such as a MAC protocol data unit (PDU)), as described herein. As such, the second random access message 235 may be scheduled on a PDCCH using an identity reserved for random access messaging, for example, an RA-RNTI. The UE 115 (and additional UEs (not shown)) may monitor the PDCCH to detect and receive a random access message (such as the second random access message 235). In some examples, the UE 115 may monitor the PDCCH for a random access message transmission from the base station 105 during a random access response window, which may be fixed or variable in size. For example, if the UE 115 does not detect and receive a random access message transmission from the base station 105, the random access attempt may be as associated with a failure and the random access procedure may repeat. However, in the subsequent attempt, the random access response window may be adjusted (such as increased or decreased in length (duration)).

Once the UE 115 successfully receives the second random access message 235, the UE 115 may obtain uplink synchronization with the base station 105. In some examples, before data transmission from the UE 115, a unique identifier within the cell (such as a C-RNTI) may be assigned to the UE 115. In some examples, depending on a state of the UE 115 there may be a need for additional message (such as a connection request message) exchange for setting up the connection between the base station 105 and the UE 115. The UE 115 may transmit any additional messages, for example, the third random access message 240 to the base station 105 using the UL-SCH resources (or PUSCH resources) assigned in the second random access message 235. The second random access message 235 may include a UE identifier for contention resolution. If the UE 115 is in a connected state, for example, the UE identifier may be a C-RNTI. Otherwise, the UE identifier may be specific to the UE 115.

The base station 105 may receive the third random access message 240 and may respond properly, for example, by transmitting the fourth random access message 245, which may be a contention resolution message. When multiple UEs (including the UE 115) are simultaneously performing random access attempts using a same preamble sequence, the multiple UEs may listen for a same response message (such as a random access message). Each UE (including the UE 115) may receive the fourth random access message 245 and compare an identifier (such as a network identifier) in the fourth random access message 245 to the identifier specified in the third random access message 240. When the identifiers match, the corresponding UE (such as the UE 115) may declare the random access procedure successful. UEs that do not identify a match between the identifiers are considered to have failed the random access procedure and may repeat the random access procedure with the base station 105. As a result of the connection procedure, the base station 105 and the UE 115 may establish a connection for wired or wireless communication.

In the example of FIG. 2, the UE 115 may be configured to operate in a mTRP transmission mode. In some cases, the UE 115 may be configured to operate in the mTRP transmission mode after a TCI state (codepoint) list and one or more RRC fields (e.g., repetition: TDM, FDM, etc.) are configured by the base station 105 as described in FIGS. 3 and 4, respectively. The UE 115 may, in some case, be unable to transmit to and receive from the one or more TRPs 108 during the initial access (e.g., in msg 2, 3, 4 in the four-step random access channel procedure) as described herein. Additionally, the UE 115 may, in some case, be unable support the random access channel to the one or more TRPs 108, for example, neither for contention-based random access and contention-free random access. Various aspects of the present disclosure relate to the UE 115 supporting random access to the one or more TRPs 108. The earlier the UE 115 can switch to mTRP mode, the earlier the UE 115 may experience benefits of mTRP (e.g., increased robustness in wireless communications).

The UE 115 may be configured to distinguish which SSBs 215 are from which TRPs 108, such that the UE 115 can random access to different TRPs 108. In some examples, during initial access, the UE 115 may determine an association between a TRP 108 and one or more SSBs 215 based on indications (e.g., information elements) in a master information block (MIB) 220 (e.g., a physical cell identity (PCI)), a system information block (SIB) 225 (e.g., a SIB1), or a predefined rule. The UE 115 may determine an SSB ID from a respective MIB 220 (e.g., PBCH) and a respective SIB 225 may identify the association between a TRP 108 and one or more SSBs 215. By way of example, if a respective SIB 225 indicates 2 TRPs and 64 SSBs with the base station 105, then the first 32 SSB IDs may correspond to a first TRP 108 and the remaining may correspond to a second TRP 108.

In some examples, the UE 115 may have previously been connected to the base station 105 before performing contention-based random access (e.g., for beam failure recovery purpose), in these examples the UE 115 may know the association based on a configuration (e.g., an RRC configuration) from the base station 105. In the RRC configuration, each TCI state may be associated with a control resource set (CORESET) pool identifier (ID) which is an indication of TRP ID. If a TCI state uses an SSB as its source reference signal, then the SSB is also associated with the same TRP 108.

The UE 115 may measure one or more SSBs 215 and based on the identification, select a preferred SSBs for each TRP 108. For example, the UE 115 may select a preferred SSB 215 and decode the MIB 220, as well as the SIB 225 to determine a corresponding random access occasion. The SIB 225 may also include other RRC configuration information, as described herein. In some examples, the UE 115 may be configured to transmit, the base station 105, a report including an indication of its preferred SSBs 215 for each TRP 108.

In some cases, such as contention-based random access, the UE 115 might be unable to transmit the first random access message 230 on multiple SSBs 215 using the same preamble because the base station 105 may erroneously determine that it's from two different UEs. Thus, the UE 115 may be configured to transmit the first random access message 230 to one SSB 215 of one of the TRPs 108 and later indicate other preferred SSBs 215 of the other TRP 108 in later messages. For example, the UE 115 may provide the indication in an uplink message, such as the third random access message 240 or a fifth random access message (msg5) (not shown). This allows the base station 105 to know the UE's 115 preferred beam for each TRP 108 earlier. The indication of a preferred SSB associated with a respective TRP 108 is conveyed in the beam selected to transmit the first random access message 230 (e.g., msg1). The base station 105 may thereby determine the UE's preferred SSB of the respective TRP not from decoding the first random access message 230 (e.g., msg1) but by identifying the beam used by the UE 115 to transmit the first random access message 230.

After reporting the preferred SSBs 215 for each TRP 108, the base station 105 may indicate to the UE 115 in a downlink message (e.g., a downlink control information (DCI), a MAC-CE, an RRC, etc.) to enable mTRP wireless communications (e.g., to operate in a mTRP mode). In some examples, the UE 115 may transmit the first random access message 230 (e.g., msg1) on a first SSB1 to a first TRP 108 and the third random access message 240 including an indication of its preferred SSB ID to a second TRP 108. A DCI of the fourth random access message 245 (e.g., msg 4) may indicate to the UE 115 whether the fourth random access message 245 is from the first TRP 108 or the second TRP 108, etc. If the UE 115 receives from two TRPs 108, the UE 115 may receive on a first SSB1 from the first TRP 108 and on a second SSB2 from a second TRP 108.

Alternatively, the UE 115 may be configured to autonomously enable mTRP wireless communications (e.g., to operate in a mTRP mode) after a period from reporting the preferred beam of other TRPs 108. For example, the UE 115 may enable a timer and based on the timer lapsing, the UE 115 may enable mTRP wireless communications (e.g., to operate in a mTRP mode). In some examples, the UE 115 may autonomously use the reported beam in addition to the original beam used for transmitting the first random access message 230 for support the mTRP wireless communication. In some examples, the portions of transmission associated with the TRPs 108 may be frequency-division multiplexed, time-division multiplexed, or spatial division multiplexed, or a combination thereof, based on an indication from the base station 105 (e.g., RRC or SIB1 in remaining minimum system information (RMSI)) or a predefined rule. In some example, the portions of transmission associated with the TRPs 108 may be the same or different. For example, the UE 115 may determine whether a first transmission from a first TRP 108 and a second transmission from a second TRP 108 is frequency-division multiplexed, time-division multiplexed, or spatial division multiplexed, or a combination thereof, based on an indication from the base station 105 (e.g., RRC or SIB1 in RMSI) or a predefined rule. The UE 115 may also determine whether the portions of transmission associated with the various TRPs 108 include a repetition or different from the same transport block, for example, based on an indication from the base station (e.g., RRC or SIB1 in RMSI). For example, the UE 115 may determine whether a first transmission from a first TRP 108 and a second transmission from a second TRP 108 are repetition or different from the same transport block based on an indication from the base station 105 (e.g., RRC or SIB1 in RMSI). The UE 115 may therefore identify the configuration choice based on network signaling (e.g., RRC signaling, DCI signaling). For example, a SIB1 for initial access.

The UE 115 may be configured to support contention-free random access, which may include one or more of the above operations performed by the UE 115 for the contention-based random access. In the contention-free random access, the UE 115 may transmit the first random access message 230 using its dedicated preamble in multiple beams associated with the TRPs 108. For example, the base station 105 may transmit a PDCCH order to request the UE 115 to send a contention-free random access (e.g., e.g. to measure a timing advance). In the PDCCH order, the base station 105 may indicate a TCI codepoint (a pair of TCI states, each one from one TRP) for random access. The UE 115 may transmit a random access message to each of the beams indicated in the TCI codepoint. The UE 115 may also be configured to measure the timing advance of two beams using a single PDCCH order.

For contention-free random access, the UE 115 may send the third random access message 240 (or a subsequent uplink transmission) via two or more directional beams to two or more TRPs 108. If, for example, these TRPs 108 have different propagation delays (e.g., with respect to the UE 115), two or more timing advance values (which may be related to propagation delay) may be used for the two or more directional beams corresponding to the two or more TRPs 108. The base station 105 may determine these timing advance values based on receiving the first random access message 230 from the UE 115, and may indicate the two or more timing advance values in the second random access message 235. Additionally or alternatively, the base station 105 may indicate the two or more timing advance values in a scheduling grant scheduling a subsequent uplink transmission from the UE 115. Accordingly, the UE 115 may apply the two or more timing advance values when transmitting the third random access message 240 (or the subsequent uplink transmission) to each of the two or more TRPs 108.

The UE 115 may additionally, or alternatively, be configured to support contention-free random access for beam failure recovery. For example, after the UE 115 detects a condition of beam failure is met, the UE may transmit a contention-free random access message in a preferred replacement beam to the base station 105. In some examples, the base station 105 may configure the set of the candidate replacement beams that the UE 115 can use. In mTRP cases, the set may include beams from each TRP 108, and the UE 115 may determine the beam-TRP association based on an indication from the base station 105. In case of beam failure, the UE may transmit a contention-free random access message to one beam in each TRP 108. After a predefined time period from transmitting the contention-free random access message, the UE 115 may prepare to receive a PDCCH as response to the contention-free random access in all the beams that it transmits the contention-free random access message (e.g., preamble). In some examples, the base station 105 may exclusively transmit in a subset of the beams (e.g., random access channel beams). In some examples, reception of a PDCCH from a single beam is sufficient to complete the beam failure recovery.

The UE 115, in the wireless communications system 200, may thus be configured to receive a set of SSBs 215 from TRPs 108. The UE 115 may be, in some examples, configured to distinguish which SSBs 215 are from which TRP 108 such that it can perform random access to the different TRPs 108. The UE 115 may be configured to transmit a report including an indication of preferred SSBs 215 for each TRP 108. After reporting the preferred SSBs 215 (e.g., preferred directional beams) for each TRP 108, the UE 115 may be enabled to support wireless communications (e.g., downlink reception, uplink transmission) from and to the TRP 108. By supporting random access to the TRP 108, the UE 115 may experience power saving by promoting higher reliability and lower latency wireless communications, among other benefits.

Figure 3:
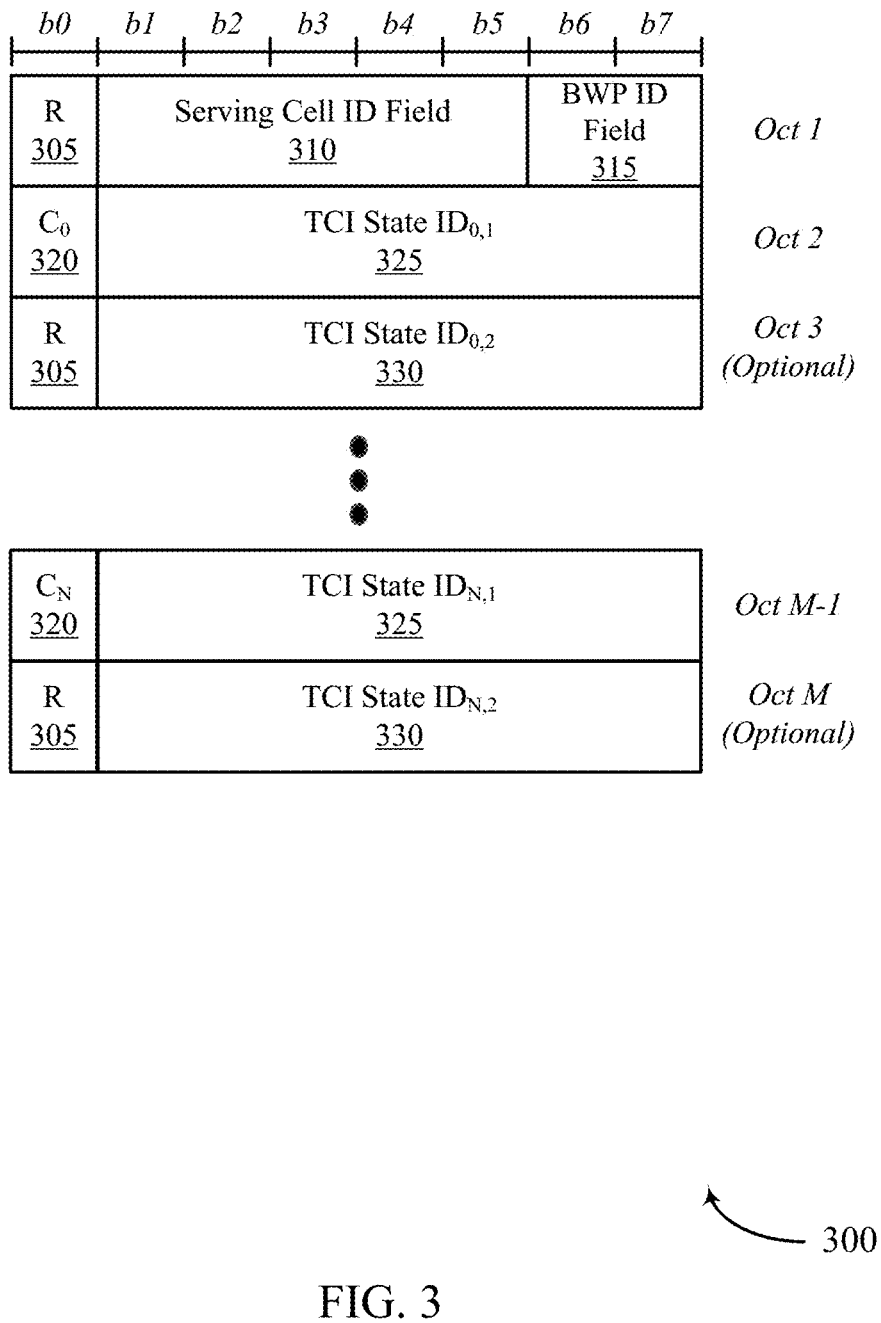
FIGS. 3 and 4 illustrates examples of messages that support a random access channel procedure for mTRPs in accordance with aspects of the present disclosure.

FIG. 3 illustrates an example of a message 300 that supports a random access channel procedure for mTRPs in accordance with aspects of the present disclosure. The message 300 may implement aspects of the wireless communications system 100 and the wireless communications system 200 as described in FIGS. 1 and 2, respectively. The operations associated with the message 300 may be based on a configuration by a base station 105 and implemented by a UE 115 or its components as described herein. For example, the message 300 may be used to activate a TCI state or deactivate a TCI state, or a combination. The message 300 may include a bitmap having a number of bit fields (e.g., $b_0$, $b_1$, $b_2$, $b_3$, $b_4$, $b_5$, $b_6$, $b_7$).

For example, the first eight bits of the message 300 may include a reserved bit field 305, a serving cell ID field 310, and a BWP ID field 315. The serving cell ID field 310 may indicate a serving cell ID of a serving cell (e.g., a base station 105, a TRP 108) and the BWP ID field 315 may indicate a BWP associated with the serving cell (e.g., the base station 105, the TRP 108). Additionally, or alternatively, the message 300 may include a number of control bit fields 320 and one or more multiple pairs of TCI state ID fields 325 and 330. In some examples, the message 300 may support up to eight pairs of TCI states for a data channel (e.g., a PDSCH). Each pair can be two TCI stats or a single TCI (with the second TCI field reserved).

Figure 4:
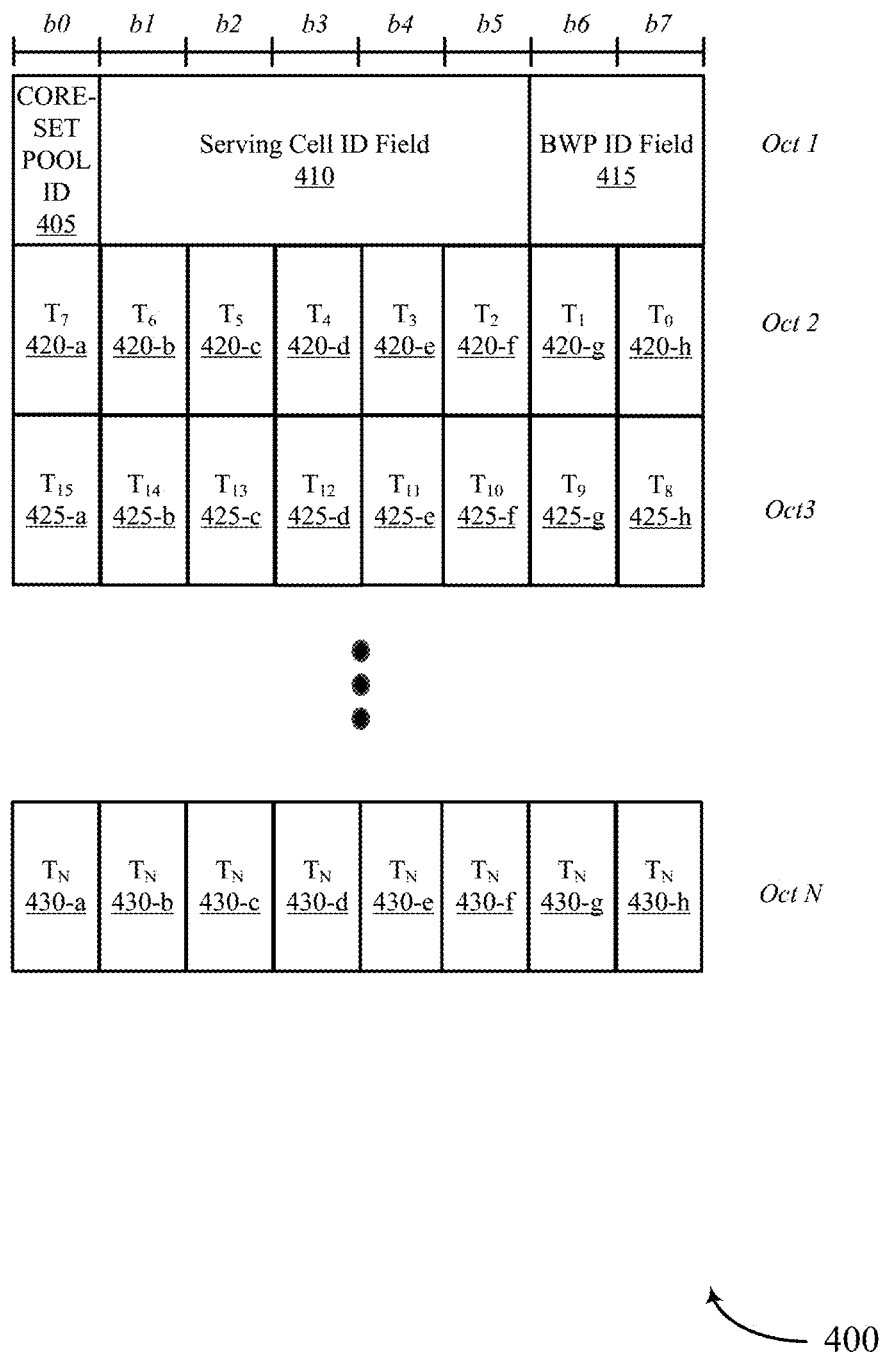

FIG. 4 illustrates an example of a message 400 that supports a random access channel procedure for mTRPs in accordance with aspects of the present disclosure. The message 400 may implement aspects of the wireless communications system 100 and the wireless communications system 200 as described in FIGS. 1 and 2, respectively. The operations associated with the message 400 may be based on a configuration by a base station 105 and implemented by a UE 115 or its components as described herein. For example, the message 400 may be used to activate a TCI state or deactivate a TCI state, or a combination. The message 400 may include a bitmap having a number of bit fields (e.g., $b_0$, $b_1$, $b_2$, $b_3$, $b_4$, $b_5$, $b_6$, $b_7$). For example, the first eight bits of the message 400 may include a coreset pool ID field 405, a serving cell ID field 410, and a BWP ID field 415.

The coreset pool ID field 405 may provide an indication of a TRP ID (e.g., a TRP 108). The serving cell ID field 410 may indicate a serving cell ID of a serving cell (e.g., a base station 105, a TRP 108) and the BWP ID field 415 may indicate a BWP associated with the serving cell (e.g., the base station 105, the TRP 108). Additionally, or alternatively, the message 400 may include a number of TCI bit fields 420, 425, and 430. These TCI bit fields 420, 425, and 430 may indicate the activation or the deactivation status of a TCI state. For example, if a bit in a respective TCI bit field 420, 425, or 430 is set to a bit value one, the UE 115 may activate the TCI state mapped to the position of the bit. If the bit in the respective TCI bit field 420, 425, or 430 is set to a bit value zero, the UE 115 may deactivate the TCI state mapped to the position of the bit.

The list of bits that are set to a bit value one may be assigned to a table referred to as a codepoint. The codepoint to which the TCI state is mapped is determined by its ordinal position among all the TCI states with a respective TCI bit fields 420, 425, or 430 set to 1 (i.e. the first TCI State with a respective TCI bit fields 420, 425, or 430 set to one shall be mapped to the codepoint value zero, a second TCI state with a respective TCI bit fields 420, 425, or 430 set to one shall be mapped to the codepoint value one and so on. In some examples, the maximum number of activated TCI states may be eight.

Figure 5:
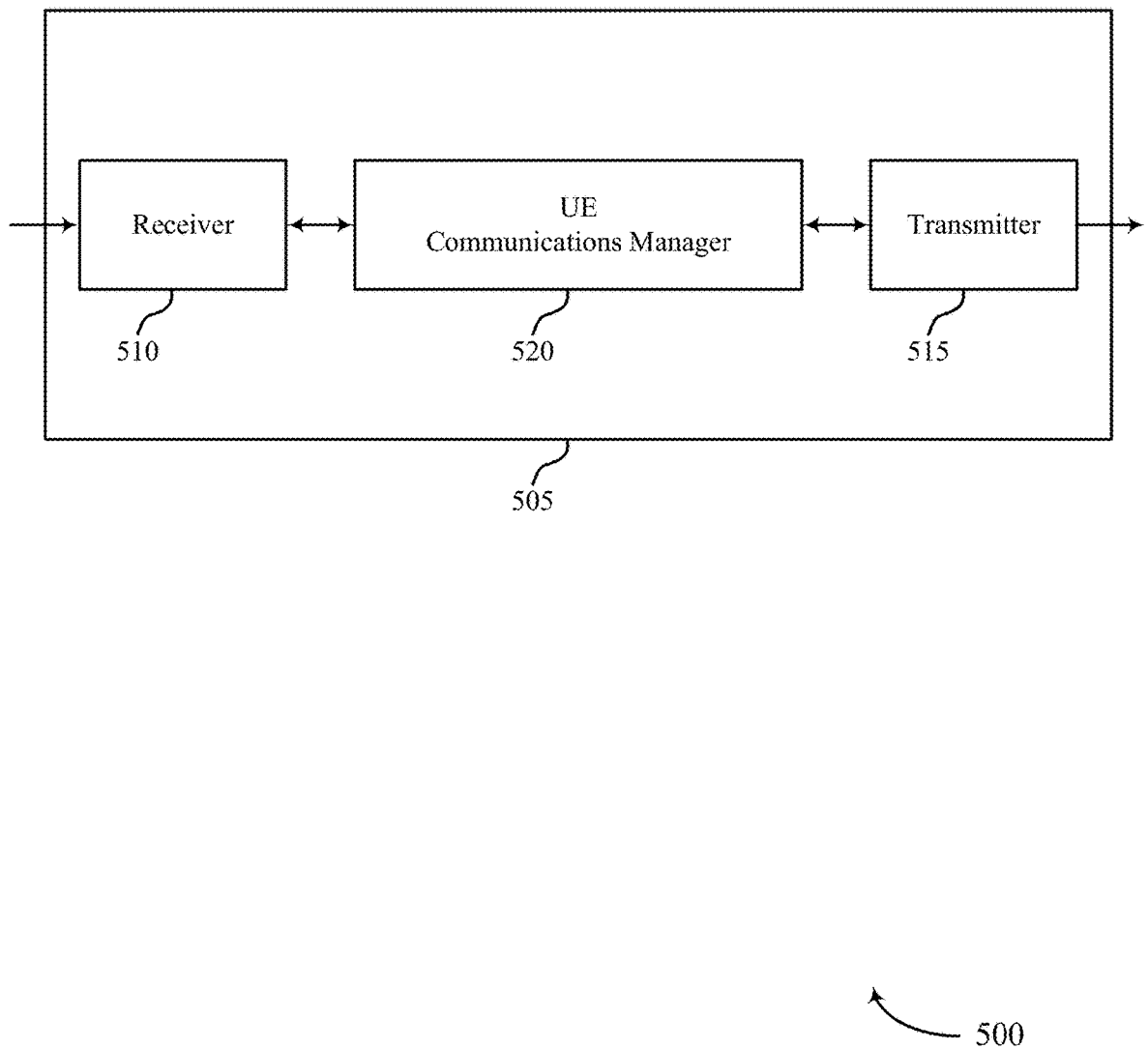
FIGS. 5 and 6 show block diagrams of devices that support a random access channel procedure for mTRPs in accordance with aspects of the present disclosure.

FIG. 5 shows a block diagram 500 of a device 505 that supports a random access channel procedure for mTRPs in accordance with aspects of the present disclosure. The device 505 may be an example of aspects of a UE 115 as described herein. The device 505 may include a receiver 510, a transmitter 515, and a UE communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a random access channel procedure for mTRPs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a random access channel procedure for mTRPs). In some examples, the transmitter 515 may be co-located with a receiver 510 in a transceiver module. The transmitter 515 may utilize a single antenna or a set of multiple antennas.

The UE communications manager 520, the receiver 510, the transmitter 515, or various combinations thereof or various components thereof may be examples of means for performing various aspects of a random access channel procedure for mTRPs as described herein. For example, the UE communications manager 520, the receiver 510, the transmitter 515, or various combinations or components thereof may support a method for performing one or more of the functions described herein.

In some examples, the UE communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the UE communications manager 520, the receiver 510, the transmitter 515, or various combinations or components thereof may be implemented in code (e.g., as communications management software or firmware) executed by a processor. If implemented in code executed by a processor, the functions of the UE communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the UE communications manager 520 may be configured to perform various operations (e.g., receiving, monitoring, transmitting) using or otherwise in cooperation with the receiver 510, the transmitter 515, or both. For example, the UE communications manager 520 may receive information from the receiver 510, send information to the transmitter 515, or be integrated in combination with the receiver 510, the transmitter 515, or both to receive information, transmit information, or perform various other operations as described herein.

The UE communications manager 520 may support wireless communication at a UE in accordance with examples as disclosed herein. For example, the UE communications manager 520 may be configured as or otherwise support a means for receiving a set of SSBs from a set of TRPs during an initial access procedure, the set of SSBs including a first subset of SSBs associated with a first TRP of the set of TRPs and a second subset of SSBs associated with a second TRP of the set of TRPs, each SSB of the set of SSBs corresponding to a respective directional beam. The UE communications manager 520 may be configured as or otherwise support a means for transmitting, to a base station, an indication of a selected first SSB from the first subset of SSBs associated with the first TRP and a selected second SSB from the second subset of SSBs associated with the second TRP. The UE communications manager 520 may be configured as or otherwise support a means for performing a random access channel procedure based on the transmitted indication. By including or configuring the UE communications manager 520 in accordance with examples as described herein, the device 505 (e.g., a processor controlling or otherwise coupled to the receiver 510, the transmitter 515, the UE communications manager 520, or a combination thereof) may support techniques for random access channel procedure for mTRPs, the device 505 may experience reduced power consumption.

Figure 6:
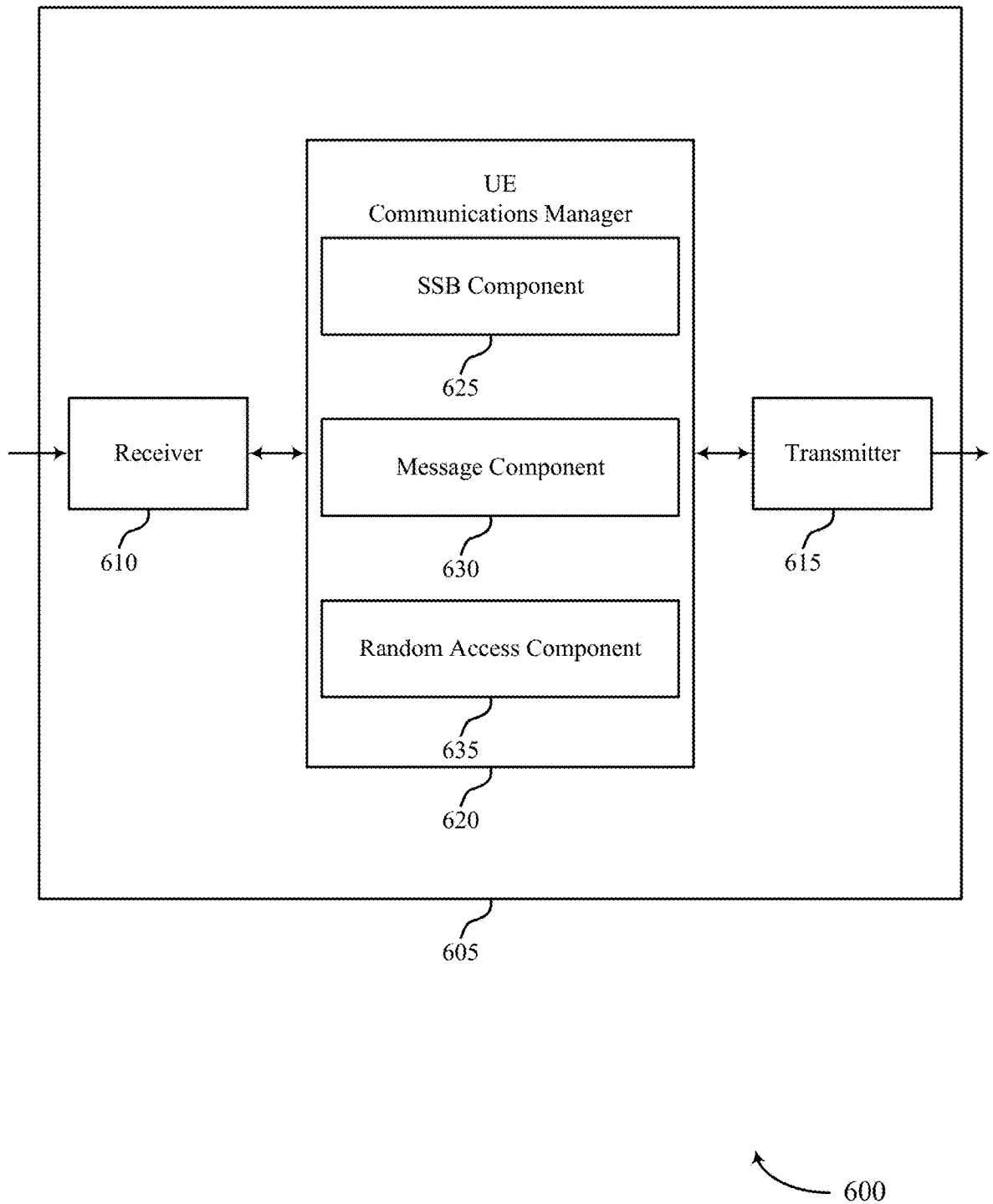

FIG. 6 shows a block diagram 600 of a device 605 that supports a random access channel procedure for mTRPs in accordance with aspects of the present disclosure. The device 605 may be an example of aspects of a device 505 or a UE 115 as described herein. The device 605 may include a receiver 610, a transmitter 615, and a UE communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a random access channel procedure for mTRPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a random access channel procedure for mTRPs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of a random access channel procedure for mTRPs as described herein. For example, the UE communications manager 620 may include an SSB component 625, a message component 630, a random access component 635, or any combination thereof. The UE communications manager 620 may be an example of aspects of a UE communications manager 520 as described herein. In some examples, the UE communications manager 620, or various components thereof, may be configured to perform various operations (e.g., receiving, monitoring, transmitting) using or otherwise in cooperation with the receiver 610, the transmitter 615, or both. For example, the UE communications manager 620 may receive information from the receiver 610, send information to the transmitter 615, or be integrated in combination with the receiver 610, the transmitter 615, or both to receive information, transmit information, or perform various other operations as described herein.

The UE communications manager 620 may support wireless communication at a UE in accordance with examples as disclosed herein. The SSB component 625 may be configured as or otherwise support a means for receiving a set of SSBs from a set of TRPs during an initial access procedure, the set of SSBs including a first subset of SSBs associated with a first TRP of the set of TRPs and a second subset of SSBs associated with a second TRP of the set of mTRPs, each SSB of the set of SSBs corresponding to a respective directional beam. The message component 630 may be configured as or otherwise support a means for transmitting, to a base station, an indication of a selected first SSB from the first subset of SSBs associated with the first TRP and a selected second SSB from the second subset of SSBs associated with the second TRP. The random access component 635 may be configured as or otherwise support a means for performing a random access channel procedure based on the transmitted indication.

Figure 7:
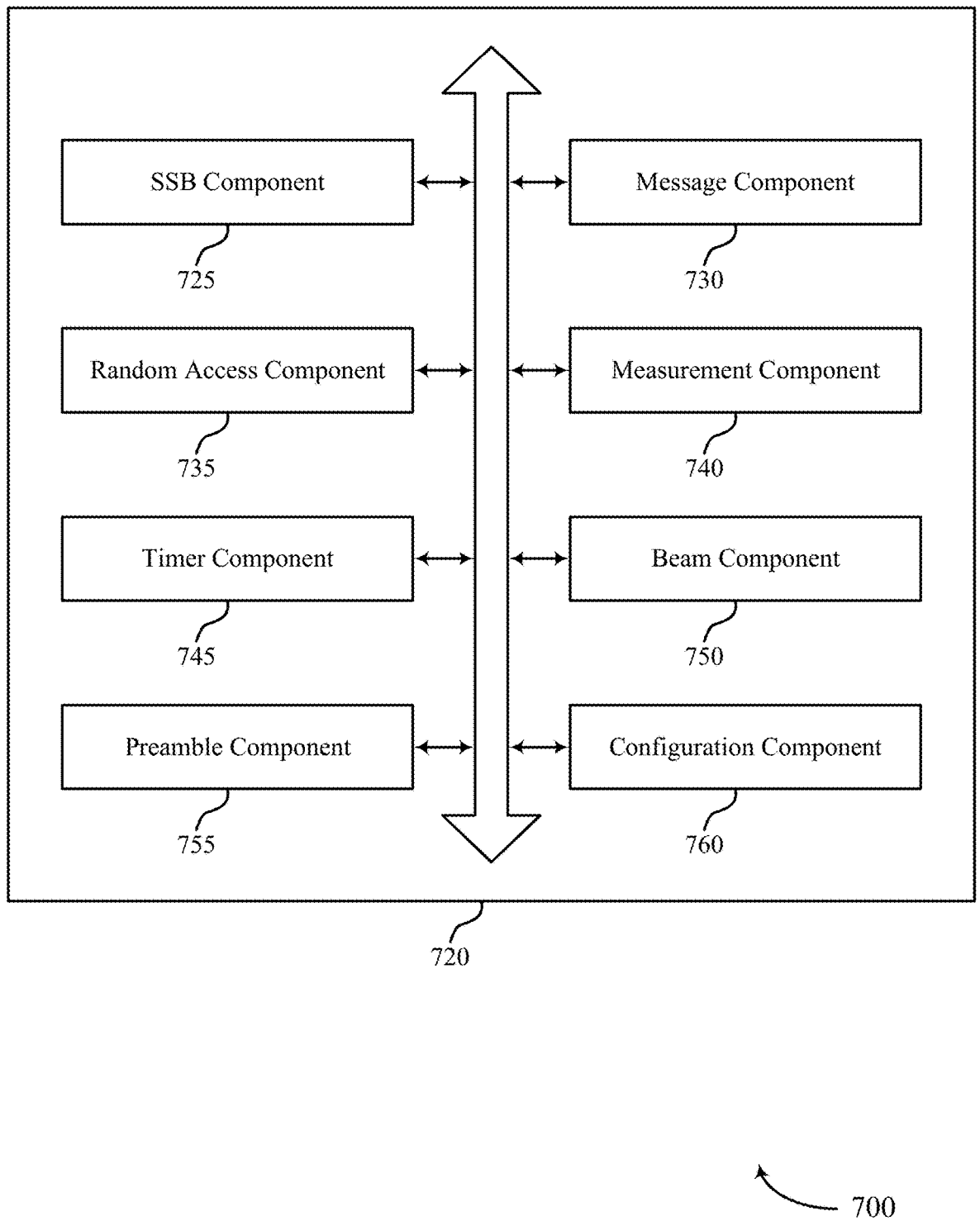
FIG. 7 shows a block diagram of a UE communications manager that supports a random access channel procedure for mTRPs in accordance with aspects of the present disclosure.

FIG. 7 shows a block diagram 700 of a UE communications manager 720 that supports a random access channel procedure for mTRPs in accordance with aspects of the present disclosure. The UE communications manager 720 may be an example of aspects of a UE communications manager 520, a UE communications manager 620, or both, as described herein. The UE communications manager 720, or various components thereof, may be an example of means for performing various aspects of a random access channel procedure for mTRPs as described herein. For example, the UE communications manager 720 may include an SSB component 725, a message component 730, a random access component 735, a measurement component 740, a timer component 745, a beam component 750, a preamble component 755, a configuration component 760, or any combination thereof. Each of these components may communicate, directly or indirectly, with one another (e.g., via one or more buses).

The UE communications manager 720 may support wireless communication at a UE in accordance with examples as disclosed herein. The SSB component 725 may be configured as or otherwise support a means for receiving a set of SSBs from a set of TRPs during an initial access procedure, the set of SSBs including a first subset of SSBs associated with a first TRP of the set of TRPs and a second subset of SSBs associated with a second TRP of the set of TRPs, each SSB of the set of SSBs corresponding to a respective directional beam. The message component 730 may be configured as or otherwise support a means for transmitting, to a base station, an indication of a selected first SSB from the first subset of SSBs associated with the first TRP and a selected second SSB from the second subset of SSBs associated with the second TRP. The random access component 735 may be configured as or otherwise support a means for performing a random access channel procedure based on the transmitted indication.

The SSB component 725 may be configured as or otherwise support a means for determining the first subset of SSBs associated with the first TRP of the set of TRPs and the second subset of SSBs associated with the second TRP of the set of TRPs based on a predefined rule. In some examples, the message component 730 may be configured as or otherwise support a means for receiving a MIB on a PBCH, the MIB including a set of SSB identifiers associated with the set of SSBs. In some examples, the SSB component 725 may be configured as or otherwise support a means for determining the first subset of SSBs associated with the first TRP of the set of TRPs and the second subset of SSBs associated with the second TRP of the set of TRPs based on the set of SSB identifiers. In some examples, the message component 730 may be configured as or otherwise support a means for receiving RMSI in a SIB, the RMSI mapping the first subset of SSBs to the first TRP of the set of TRPs and the second subset of SSBs to the second TRP of the set of TRPs based on the set of SSB identifiers. In some examples, the SSB component 725 may be configured as or otherwise support a means for determining the first subset of SSBs associated with the first TRP of the set of TRPs and the second subset of SSBs associated with the second TRP of the set of TRPs based on the mapping.

The measurement component 740 may be configured as or otherwise support a means for measuring each SSB from the first subset of SSBs associated with the first TRP and each SSB from the second subset of SSBs associated with the second TRP. In some examples, the measurement component 740 may be configured as or otherwise support a means for selecting the first SSB from the first subset of SSBs associated with the first TRP and the second SSB from the second subset of SSBs associated with the second TRP based on the measuring. In some examples, the SSB component 725 may be configured as or otherwise support a means for determining the first subset of SSBs associated with the first TRP of the set of TRPs and the second subset of SSBs associated with the second TRP of the set of TRPs based on an RRC configuration. In some examples, the RRC configuration includes a set of TCI states associated with a set of control resource set pool identifiers. In some examples, the set of control resource set pool identifiers correspond to a set of TRP identifiers associated with the set of TRPs.

The message component 730 may be configured as or otherwise support a means for transmitting, to the base station, a first random access channel message on a beam corresponding to the selected first SSB from the first subset of SSBs associated with the first TRP. In some examples, the message component 730 may be configured as or otherwise support a means for transmitting, to the base station, a random access channel preamble of the first random access channel message on the beam corresponding to the selected first SSB from the first subset of SSBs associated with the first TRP. In some examples, the message component 730 may be configured as or otherwise support a means for transmitting, to the base station, an uplink message the indication of the selected second SSB from the second subset of SSBs associated with the second TRP based on transmitting the first random access channel message. In some examples, the uplink message including the indication of the selected second SSB is transmitted on the beam corresponding to the selected first SSB associated with the first TRP, the indication is encoded in a field of the uplink message. In some examples, the uplink message includes a third random access channel message (e.g., msg3) or a fifth random access channel message (e.g. msg5).

The preamble component 755 may be configured as or otherwise support a means for transmitting, to the base station, a dedicated random access channel preamble of the first random access channel message on a first beam corresponding to the selected first SSB from the first subset of SSBs associated with the first TRP and on a second beam corresponding to the selected second SSB from the second subset of SSBs associated with the second TRP using a set of multiple directional beams associated with the set of SSBs. In some examples, the message component 730 may be configured as or otherwise support a means for receiving, from the base station, a downlink control message on a PDCCH, the downlink control message including a TCI codepoint for the random access channel procedure. In some examples, the message component 730 may be configured as or otherwise support a means for transmitting the dedicated random access channel preamble of the first random access channel message the indication of the selected first SSB from the first subset of SSBs associated with the first TRP and the selected second SSB from the second subset of SSBs associated with the second TRP is based on the TCI codepoint. In some examples, the TCI codepoint includes a pair of TCI states for each TRP of the set of mTRPs.

In some examples, the message component 730 may be configured as or otherwise support a means for receiving, from the base station, a downlink control message including a second indication to perform the wireless communication, where the wireless communication includes an mTRP wireless transmission to and from the first TRP and the second TRP. In some examples, the mTRP wireless transmission to the first TRP may include using a beam corresponding to the indication of the first selected SSB (e.g., beam) associated with the first TRP. Additionally, the mTRP wireless transmission to the second TRP may include using the beam corresponding to the indication of the second selected SSB (e.g., beam) associated with the second TRP. In some examples, the downlink control message includes a DCI message, a MAC-CE message, or an RRC message, or a combination thereof. In some cases, the downlink message may be encoded as a single bit information (e.g., 1 bit) to indicate whether single TRP or mTRP operation will be performed subsequently. In some examples, the timer component 745 may be configured as or otherwise support a means for enabling a timer based on the transmitted indication. In some other example, the timer may start upon the indication of the selected SSB (e.g., beam) is transmitted to the base station or an acknowledgment (ACK) of the indication message is received from the base station. In some examples, the timer component 745 may be configured as or otherwise support a means for autonomously using the indicated first and second SSBs associated with the first and second TRPs to receive or transmit the wireless communication to or from both the first TRP and the second TRP based on the timer lapsing.

In some examples, to support performing the wireless communication, the SSB component 725 may be configured as or otherwise support a means for receiving or transmitting the wireless communication to and from the first TRP and the second TRP using a first respective directional beam associated with the selected first SSB from the first subset of SSBs associated with the first TRP, a second respective directional beam associated with the selected second SSB from the second subset of SSBs associated with the second TRP, or a respective directional beam associated with a first random access channel message transmitted to the base station, or a combination thereof. In some examples, the wireless communication to or from the first TRP and the second TRP is frequency-division multiplexed based on an indication from the base station or a predefined rule, or both. In some examples, the wireless communication to or from the first TRP and the second TRP is time-division multiplexed based on an indication from the base station or a predefined rule, or both. In some examples, the wireless communication to or from the first TRP and the second TRP is spatial-division multiplexed based on an indication from the base station or a predefined rule, or both. In some examples, the wireless communication includes a first portion from the first TRP and a second portion from the second TRP, the first portion is different from the second portion or the first portion and the second portion are the same.

The beam component 750 may be configured as or otherwise support a means for transmitting, to the base station, a random access message on a selected respective directional beam based on a directional beam failure event. In some examples, the configuration component 760 may be configured as or otherwise support a means for receiving, from the base station, a RRC configuration message including a second indication of a set of directional beams for the UE to use based on the directional beam failure event. In some examples, the configuration component 760 may be configured as or otherwise support a means for the set of directional beams to correspond to the first subset of SSBs associated with the first TRP of the set of mTRPs or the second subset of SSBs associated with the second TRP of the set of mTRPs, or both. In some examples, the configuration component 760 may be configured as or otherwise support a means for transmitting the random access message to the first TRP of the set of mTRPs and the second TRP of the set of mTRPs, where the random access message includes a dedicated preamble for beam failure recovery of the UE. In some examples, the configuration component 760 may be configured as or otherwise support a means for receiving a downlink message on a PDCCH based on the transmitted random access message.

Figure 8:
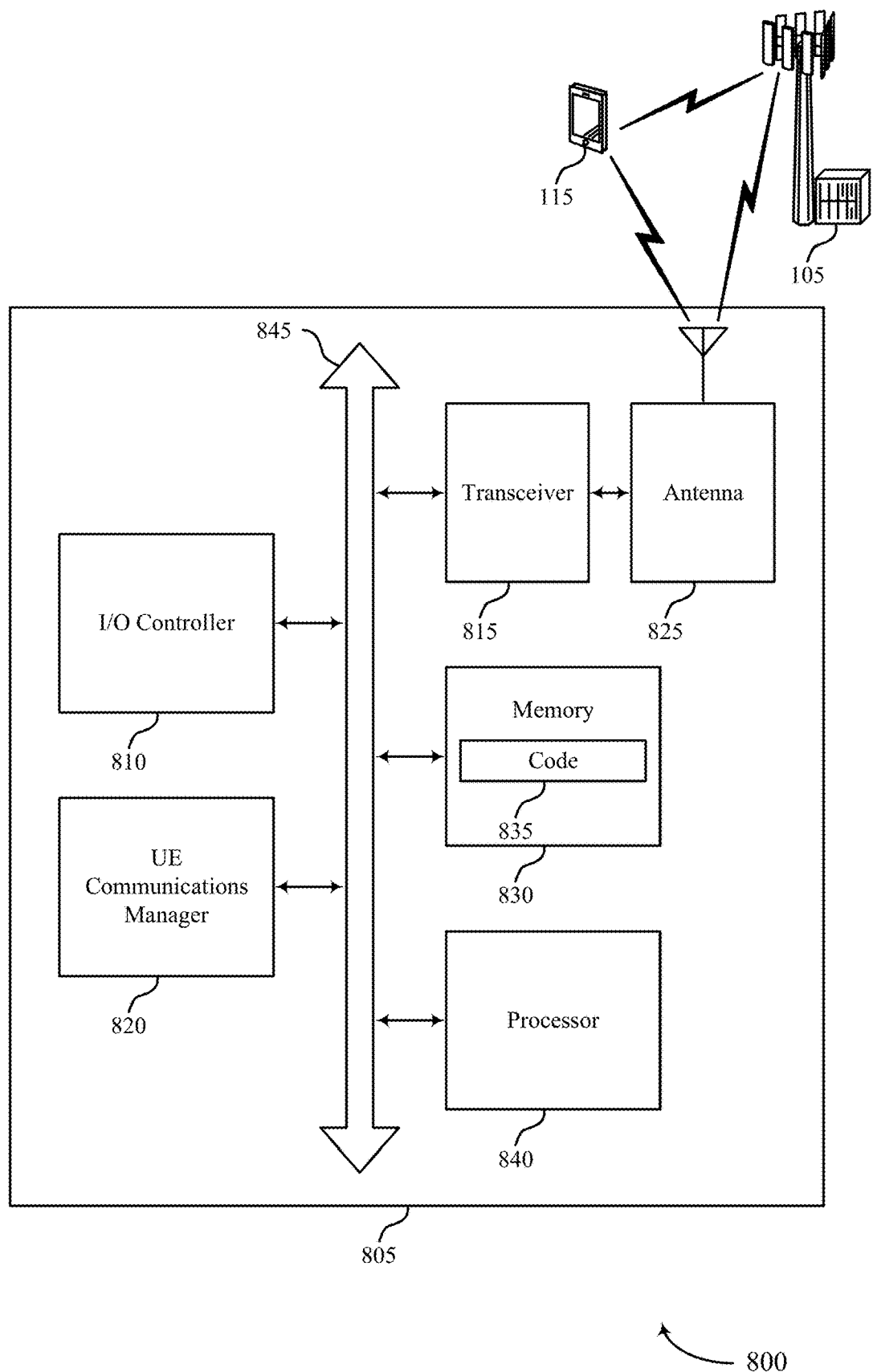
FIG. 8 shows a diagram of a system including a device that supports a random access channel procedure for mTRPs in accordance with aspects of the present disclosure.

FIG. 8 shows a diagram of a system 800 including a device 805 that supports a random access channel procedure for mTRPs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a UE communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting a random access channel procedure for mTRPs). For example, the device 805 or a component of the device 805 may include a processor 840 and memory 830 coupled to the processor 840, the processor 840 and memory 830 configured to perform various functions described herein.

The UE communications manager 820 may support wireless communication at a UE in accordance with examples as disclosed herein. For example, the UE communications manager 820 may be configured as or otherwise support a means for receiving a set of SSBs from a set of TRPs during an initial access procedure, the set of SSBs including a first subset of SSBs associated with a first TRP of the set of TRPs and a second subset of SSBs associated with a second TRP of the set of TRPs, each SSB of the set of SSBs corresponding to a respective directional beam. The UE communications manager 820 may be configured as or otherwise support a means for transmitting, to a base station, an indication of a selected first SSB from the first subset of SSBs associated with the first TRP and a selected second SSB from the second subset of SSBs associated with the second TRP. The UE communications manager 820 may be configured as or otherwise support a means for performing a random access channel procedure based on the transmitted indication.

By including or configuring the UE communications manager 820 in accordance with examples as described herein, the device 805 may support techniques for random access channel procedure for mTRPs. By including or configuring the UE communications manager 820 in accordance with examples as described herein, the device 805 may promote improvements to power consumption, spectral efficiency, higher data rates and, in some examples, may promote enhanced efficiency for high reliability and low latency wireless communications, among other benefits.

In some examples, the UE communications manager 820 may be configured to perform various operations (e.g., receiving, monitoring, transmitting) using or otherwise in cooperation with the transceiver 815, the one or more antennas 825, or any combination thereof. Although the UE communications manager 820 is illustrated as a separate component, in some examples, one or more functions described with reference to the UE communications manager 820 may be supported by or performed by the processor 840, the memory 830, the code 835, or any combination thereof. For example, the code 835 may include instructions executable by the processor 840 to cause the device 805 to perform various aspects of a random access channel procedure for mTRPs as described herein, or the processor 840 and the memory 830 may be otherwise configured to perform or support such operations.

Figure 9:
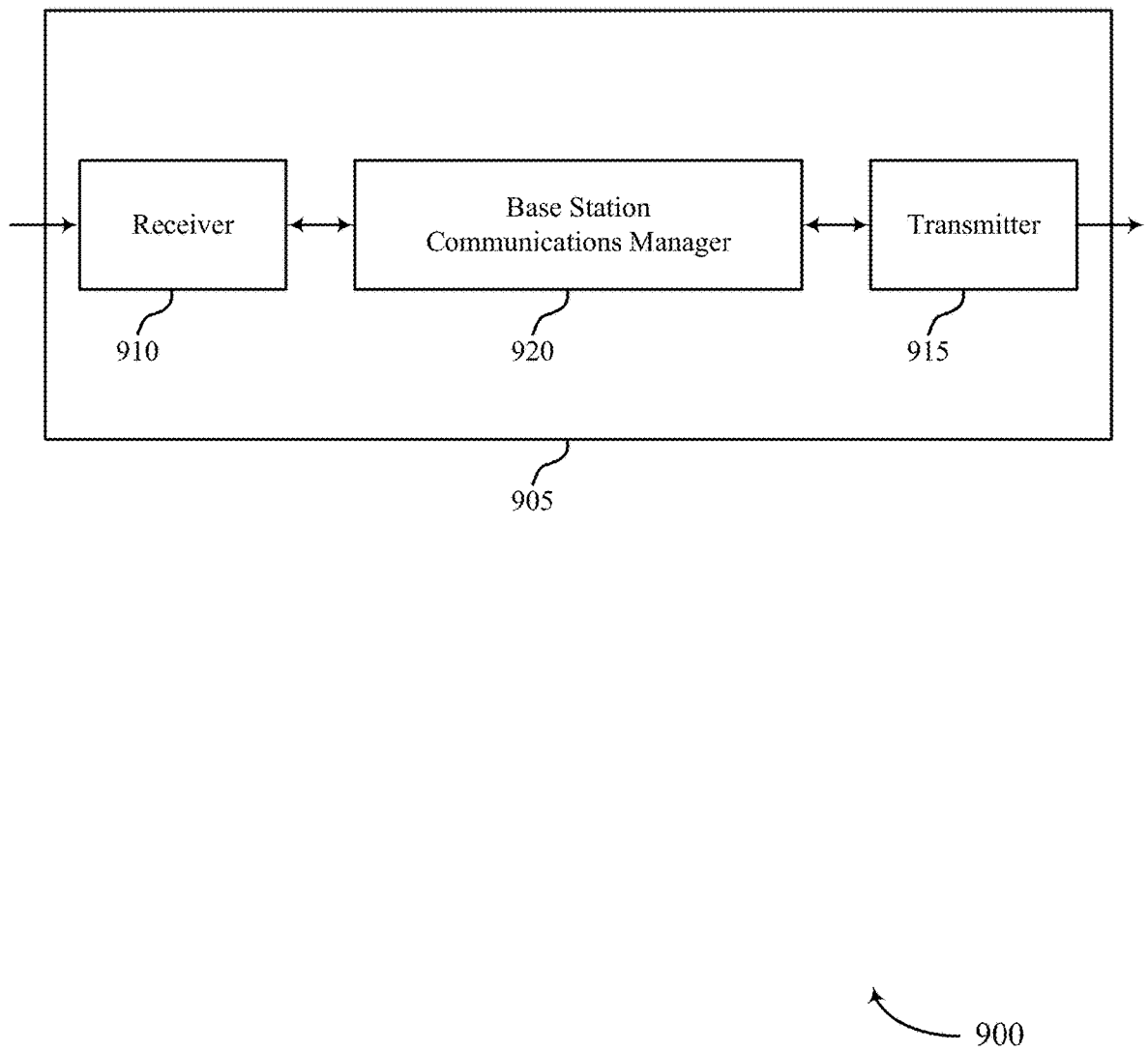
FIGS. 9 and 10 show block diagrams of devices that support a random access channel procedure for mTRPs in accordance with aspects of the present disclosure.

FIG. 9 shows a block diagram 900 of a device 905 that supports a random access channel procedure for mTRPs in accordance with aspects of the present disclosure. The device 905 may be an example of aspects of a base station 105 as described herein. The device 905 may include a receiver 910, a transmitter 915, and a base station communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a random access channel procedure for mTRPs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a random access channel procedure for mTRPs). In some examples, the transmitter 915 may be co-located with a receiver 910 in a transceiver module. The transmitter 915 may utilize a single antenna or a set of multiple antennas.

The base station communications manager 920, the receiver 910, the transmitter 915, or various combinations thereof or various components thereof may be examples of means for performing various aspects of a random access channel procedure for mTRPs as described herein. For example, the base station communications manager 920, the receiver 910, the transmitter 915, or various combinations or components thereof may support a method for performing one or more of the functions described herein.

In some examples, the base station communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the base station communications manager 920, the receiver 910, the transmitter 915, or various combinations or components thereof may be implemented in code (e.g., as communications management software or firmware) executed by a processor. If implemented in code executed by a processor, the functions of the base station communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the base station communications manager 920 may be configured to perform various operations (e.g., receiving, monitoring, transmitting) using or otherwise in cooperation with the receiver 910, the transmitter 915, or both. For example, the base station communications manager 920 may receive information from the receiver 910, send information to the transmitter 915, or be integrated in combination with the receiver 910, the transmitter 915, or both to receive information, transmit information, or perform various other operations as described herein.

The base station communications manager 920 may support wireless communication at a base station in accordance with examples as disclosed herein. For example, the base station communications manager 920 may be configured as or otherwise support a means for receiving, from a UE, an indication of a selected first SSB from a first subset of SSBs associated with a first TRP of a set of TRPs and a selected second SSB from a second subset of SSBs associated with a second TRP of the set of TRPs during an initial access procedure. The base station communications manager 920 may be configured as or otherwise support a means for performing a random access channel procedure based on the received indication. By including or configuring the base station communications manager 920 in accordance with examples as described herein, the device 905 (e.g., a processor controlling or otherwise coupled to the receiver 910, the transmitter 915, the base station communications manager 920, or a combination thereof) may support techniques for random access channel procedure for mTRPs.

Figure 10:
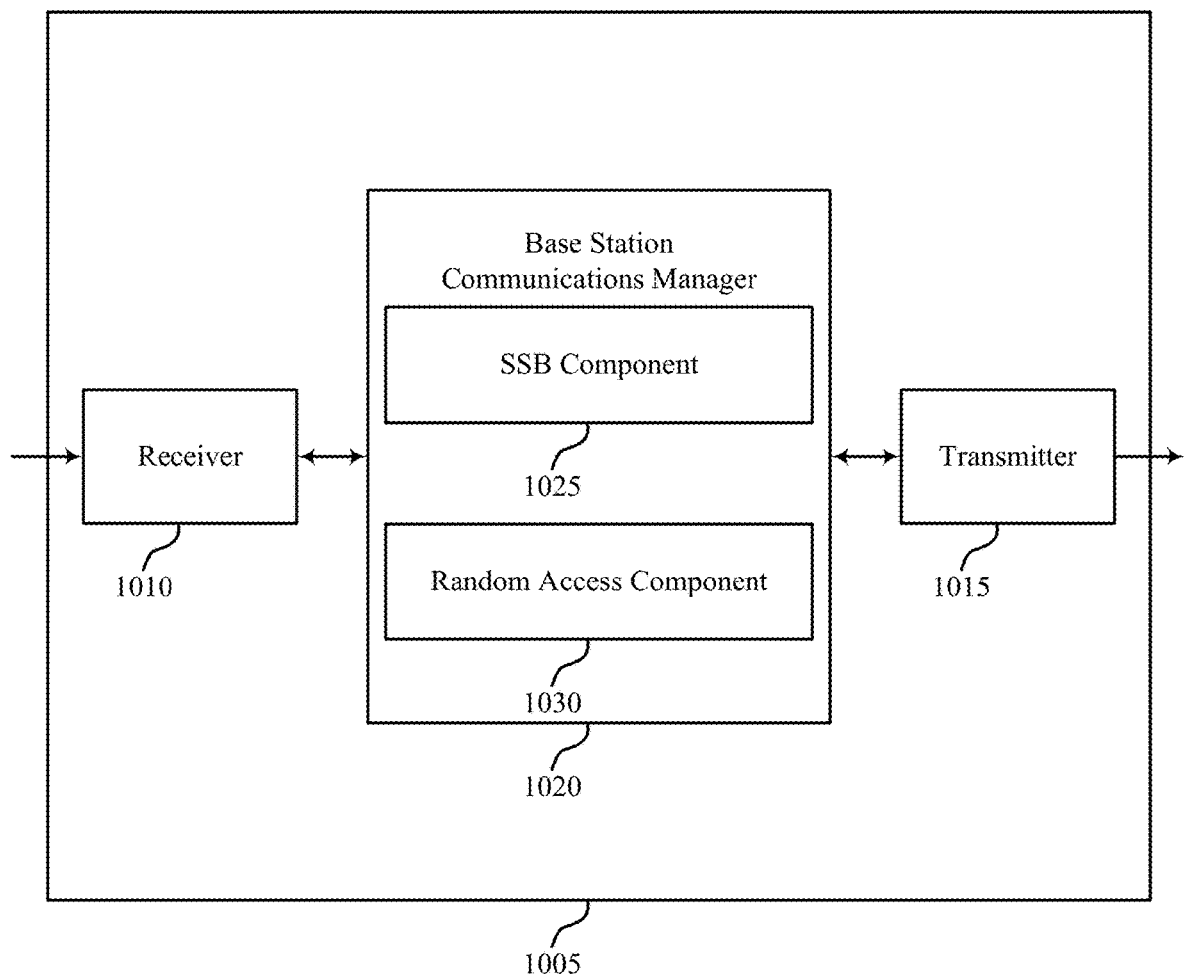

FIG. 10 shows a block diagram 1000 of a device 1005 that supports a random access channel procedure for mTRPs in accordance with aspects of the present disclosure. The device 1005 may be an example of aspects of a device 905 or a base station 105 as described herein. The device 1005 may include a receiver 1010, a transmitter 1015, and a base station communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a random access channel procedure for mTRPs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a random access channel procedure for mTRPs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a random access channel procedure for mTRPs as described herein. For example, the base station communications manager 1020 may include an SSB component 1025 a random access component 1030, or any combination thereof. The base station communications manager 1020 may be an example of aspects of a base station communications manager 920 as described herein. In some examples, the base station communications manager 1020, or various components thereof, may be configured to perform various operations (e.g., receiving, monitoring, transmitting) using or otherwise in cooperation with the receiver 1010, the transmitter 1015, or both. For example, the base station communications manager 1020 may receive information from the receiver 1010, send information to the transmitter 1015, or be integrated in combination with the receiver 1010, the transmitter 1015, or both to receive information, transmit information, or perform various other operations as described herein.

The base station communications manager 1020 may support wireless communication at a base station in accordance with examples as disclosed herein. The SSB component 1025 may be configured as or otherwise support a means for receiving, from a UE, an indication of a selected first SSB from a first subset of SSBs associated with a first TRP of a set of TRPs and a selected second SSB from a second subset of SSBs associated with a second TRP of the set of TRPs during an initial access procedure. The random access component 1030 may be configured as or otherwise support a means for performing a random access channel procedure based on the received indication.

Figure 11:
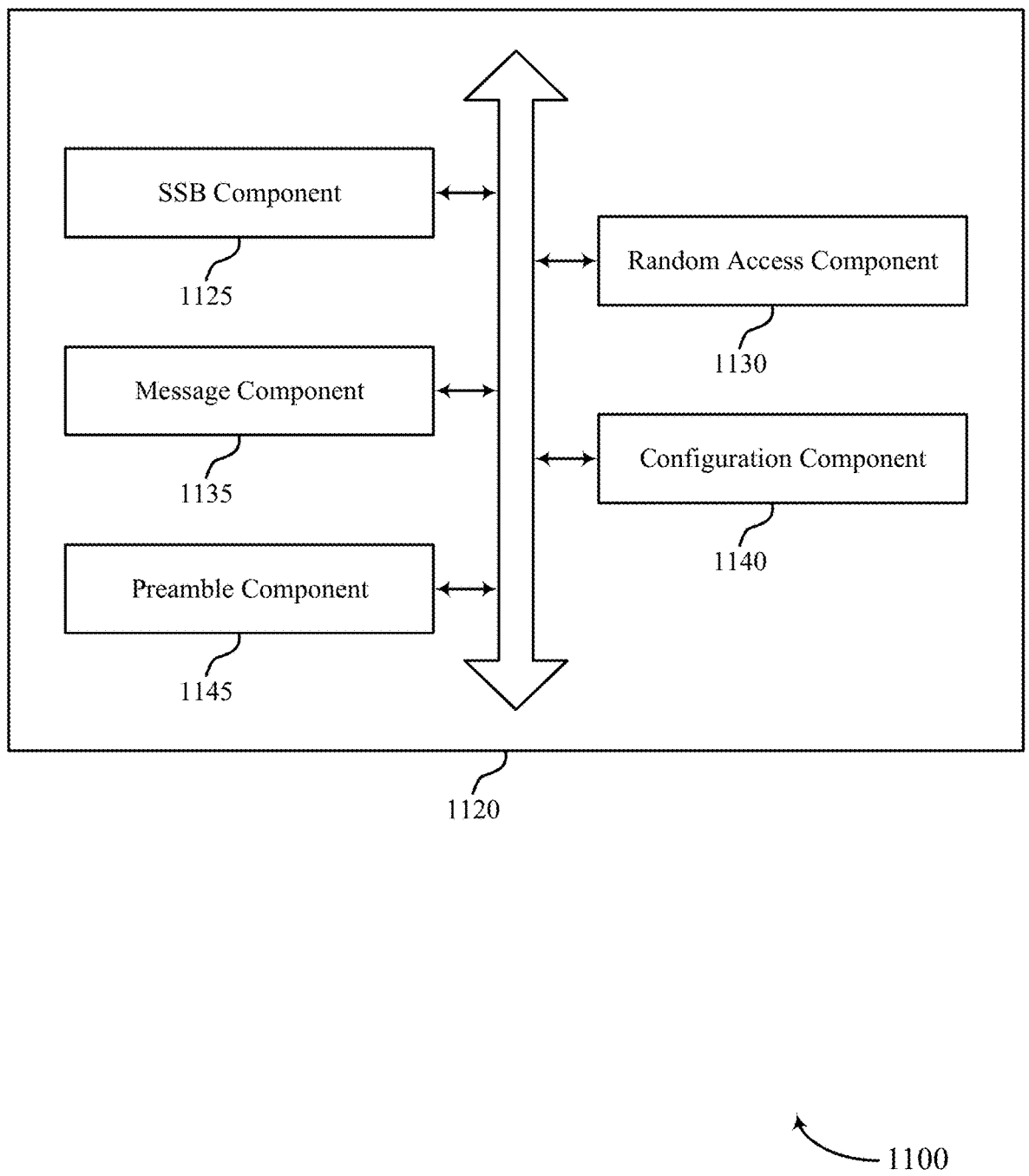
FIG. 11 shows a block diagram of a base station communications manager that supports a random access channel procedure for mTRPs in accordance with aspects of the present disclosure.

FIG. 11 shows a block diagram 1100 of a base station communications manager 1120 that supports a random access channel procedure for mTRPs in accordance with aspects of the present disclosure. The base station communications manager 1120 may be an example of aspects of a base station communications manager 920, a base station communications manager 1020, or both, as described herein. The base station communications manager 1120, or various components thereof, may be an example of means for performing various aspects of a random access channel procedure for mTRPs as described herein. For example, the base station communications manager 1120 may include an SSB component 1125, a random access component 1130, a message component 1135, a configuration component 1140, a preamble component 1145, or any combination thereof. Each of these components may communicate, directly or indirectly, with one another (e.g., via one or more buses).

The base station communications manager 1120 may support wireless communication at a base station in accordance with examples as disclosed herein. The SSB component 1125 may be configured as or otherwise support a means for receiving, from a UE, an indication of a selected first SSB from a first subset of SSBs associated with a first TRP of a set of TRPs and a selected second SSB from a second subset of SSBs associated with a second TRP of the set of TRPs during an initial access procedure. The random access component 1130 may be configured as or otherwise support a means for performing a random access channel procedure based on the received indication.

The message component 1135 may be configured as or otherwise support a means for transmitting a MIB on a PBCH, the MIB including a set of SSB identifiers associated with a set of SSBs. In some examples, the message component 1135 may be configured as or otherwise support a means for the set of SSBs includes the first subset of SSBs and the second subset of SSBs. In some examples, the message component 1135 may be configured as or otherwise support a means for transmitting RMSI in a SIB, the RMSI mapping the first subset of SSBs to the first TRP of the set of TRPs and the second subset of SSBs to the second TRP of the set of TRPs based on the set of SSB identifiers. The configuration component 1140 may be configured as or otherwise support a means for transmitting an RRC configuration, where the RRC configuration includes a set of TCI states associated with a set of control resource set pool identifiers. In some examples, the set of control resource set pool identifiers correspond to a set of TRP identifiers associated with the set of mTRPs.

In some examples, the message component 1135 may be configured as or otherwise support a means for receiving a first random access channel message on a beam corresponding to the selected first SSB from the first subset of SSBs associated with the first TRP. In some examples, the preamble component 1145 may be configured as or otherwise support a means for receiving a random access channel preamble of the first random access channel message on the beam corresponding to the selected first SSB from the first subset of SSBs associated with the first TRP. In some examples, the message component 1135 may be configured as or otherwise support a means for receiving in an uplink message the indication of the selected second SSB from the second subset of SSBs associated with the second TRP based on receiving the first random access channel message. In some examples, the uplink message including the indication of the selected second SSB is transmitted on the beam corresponding to the selected first SSB associated with the first TRP, the indication is encoded in a field of the uplink message. In some examples, the uplink message includes a third random access channel message (e.g., msg3) or a fifth random access channel message (e.g., msg5).

The preamble component 1145 may be configured as or otherwise support a means for receiving a dedicated random access channel preamble of the first random access channel message on a first beam corresponding to the selected first SSB from the first subset of SSBs associated with the first TRP and on a second beam corresponding to the selected second SSB from the second subset of SSBs associated with the second TRP using a set of multiple directional beams associated with a set of SSBs.

In some examples, the message component 1135 may be configured as or otherwise support a means for transmitting a downlink control message on a PDCCH, the downlink control message including a TCI codepoint for the random access channel procedure, where the TCI codepoint includes a pair of TCI states for each TRP of the set of mTRPs. In some examples, the message component 1135 may be configured as or otherwise support a means for transmitting a downlink control message including a second indication to perform the wireless communication, where the wireless communication includes an mTRP wireless transmission to and from the first TRP and the second TRP. In some examples, the downlink control message includes a DCI message, a MAC-CE message, or an RRC message, or a combination thereof.

The message component 1135 may be configured as or otherwise support a means for receiving a random access message on a selected respective directional beam based on a directional beam failure event. In some examples, the configuration component 1140 may be configured as or otherwise support a means for transmitting a RRC configuration message including a third indication of a set of directional beams for the UE to use based on the directional beam failure event. In some examples, the configuration component 1140 may be configured as or otherwise support a means for the set of directional beams correspond to the first subset of SSBs associated with the first TRP of the set of TRPs or the second subset of SSBs associated with the second TRP of the set of TRPs, or both. In some examples, the configuration component 1140 may be configured as or otherwise support a means for receiving the content-free random access message to the first TRP of the set of mTRPs and the second TRP of the set of TRPs. In some examples, the configuration component 1140 may be configured as or otherwise support a means for transmitting a downlink message on a PDCCH based on the transmitted content-free random access message.

Figure 12:
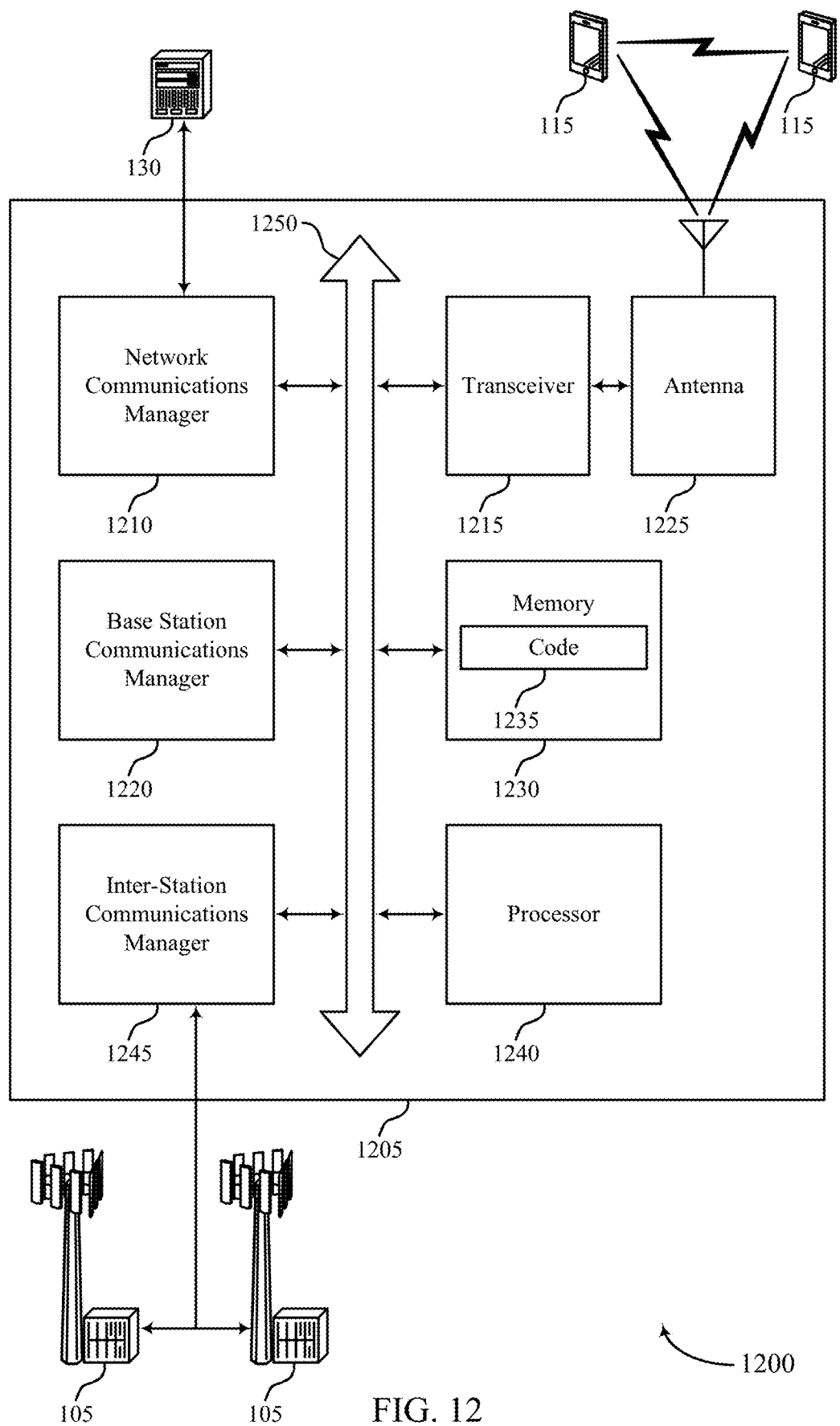
FIG. 12 shows a diagram of a system including a device that supports a random access channel procedure for mTRPs in accordance with aspects of the present disclosure.

FIG. 12 shows a diagram of a system 1200 including a device 1205 that supports a random access channel procedure for mTRPs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a base station communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

The device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting a random access channel procedure for mTRPs). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The base station communications manager 1220 may support wireless communication at a base station in accordance with examples as disclosed herein. For example, the base station communications manager 1220 may be configured as or otherwise support a means for receiving, from a UE, an indication of a selected first SSB from a first subset of SSBs associated with a first TRP of a set of TRPs and a selected second SSB from a second subset of SSBs associated with a second TRP of the set of TRPs during an initial access procedure. The base station communications manager 1220 may be configured as or otherwise support a means for performing a random access channel procedure based on the received indication. The base station communications manager 1220 may thereby promote improvements to power consumption, spectral efficiency, higher data rates and, in some examples, may promote enhanced efficiency for high reliability and low latency wireless communication operations, among other benefits.

In some examples, the base station communications manager 1220 may be configured to perform various operations (e.g., receiving, monitoring, transmitting) using or otherwise in cooperation with the transceiver 1215, the one or more antennas 1225, or any combination thereof. Although the base station communications manager 1220 is illustrated as a separate component, in some examples, one or more functions described with reference to the base station communications manager 1220 may be supported by or performed by the processor 1240, the memory 1230, the code 1235, or any combination thereof. For example, the code 1235 may include instructions executable by the processor 1240 to cause the device 1205 to perform various aspects of a random access channel procedure for mTRPs as described herein, or the processor 1240 and the memory 1230 may be otherwise configured to perform or support such operations.

Figure 13:
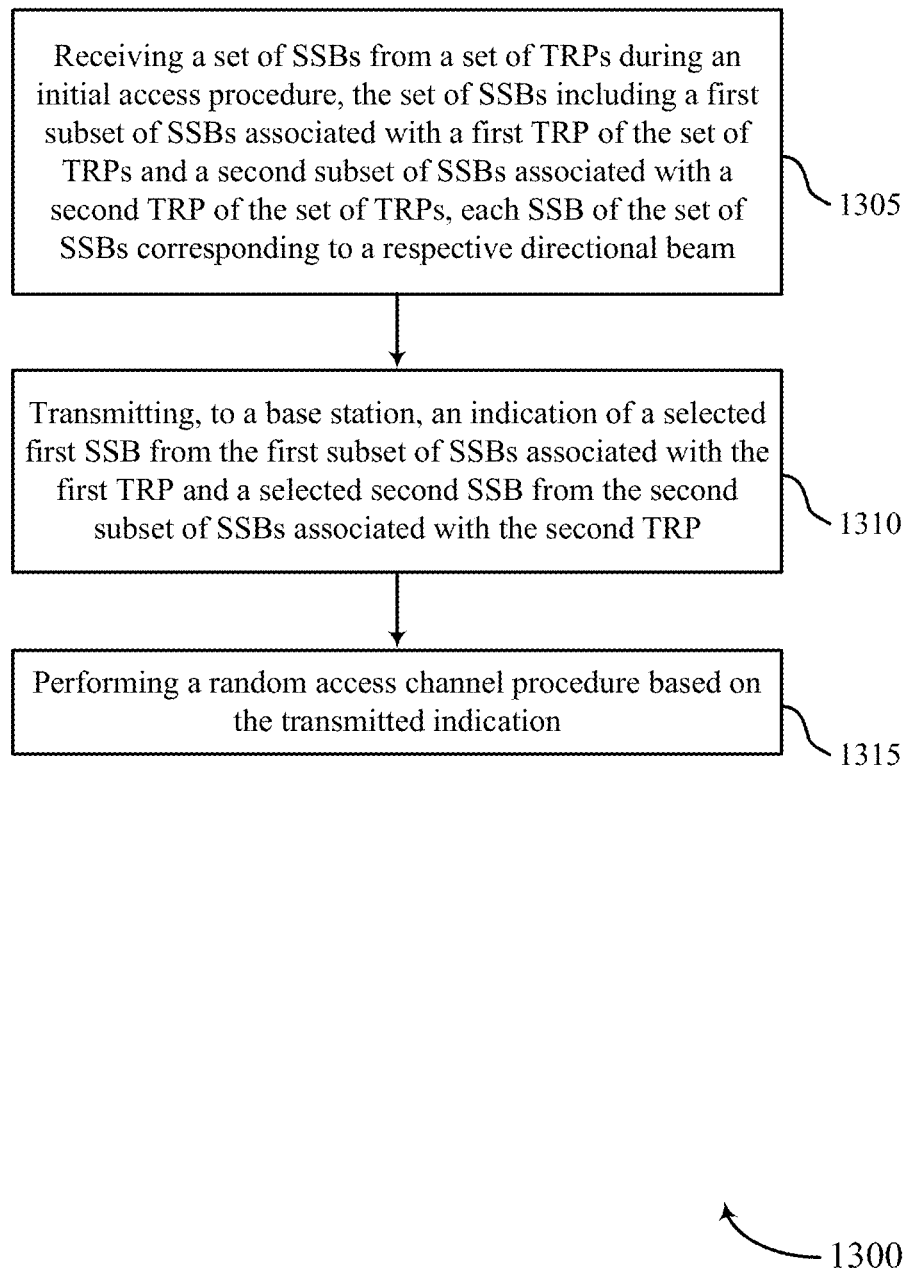
FIGS. 13 through 16 show flowcharts illustrating methods that support a random access channel procedure for mTRPs in accordance with aspects of the present disclosure.

FIG. 13 shows a flowchart illustrating a method 1300 that supports a random access channel procedure for mTRPs in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a set of SSBs from a set of TRPs during an initial access procedure, the set of SSBs including a first subset of SSBs associated with a first TRP of the set of TRPs and a second subset of SSBs associated with a second TRP of the set of TRPs, each SSB of the set of SSBs corresponding to a respective directional beam. The operations of 1305 may be performed in accordance with examples as disclosed herein. In some examples, aspects of the operations of 1305 may be performed by an SSB component 725 as described with reference to FIG. 7.

At 1310, the method may include transmitting, to a base station, an indication of a selected first SSB from the first subset of SSBs associated with the first TRP and a selected second SSB from the second subset of SSBs associated with the second TRP. The operations of 1310 may be performed in accordance with examples as disclosed herein. In some examples, aspects of the operations of 1310 may be performed by a message component 730 as described with reference to FIG. 7.

At 1315, the method may include performing a random access channel procedure based on the transmitted indication. The operations of 1315 may be performed in accordance with examples as disclosed herein. In some examples, aspects of the operations of 1315 may be performed by a random access component 735 as described with reference to FIG. 7.

Figure 14:
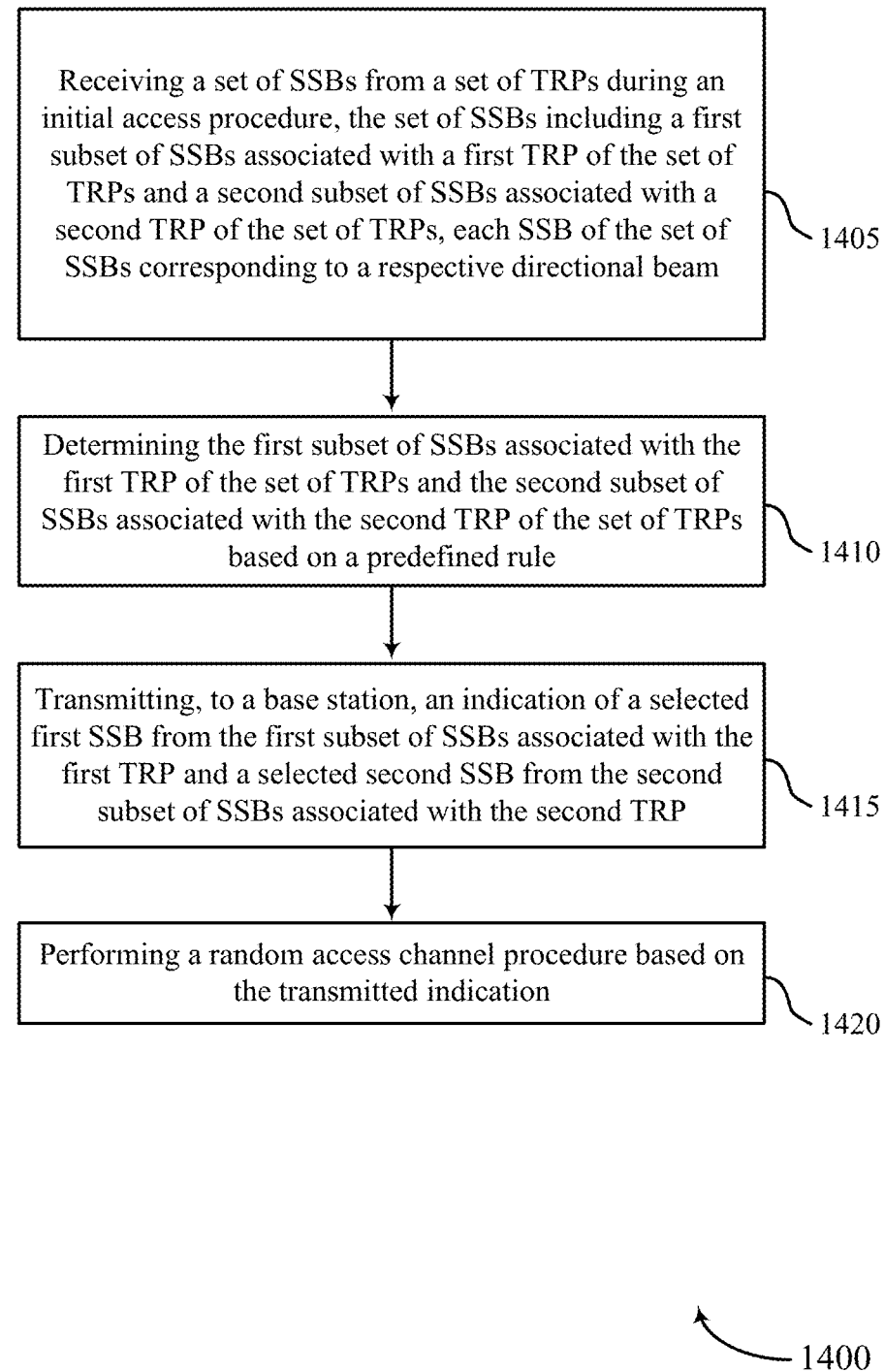

FIG. 14 shows a flowchart illustrating a method 1400 that supports a random access channel procedure for mTRPs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a set of SSBs from a set of TRPs during an initial access procedure, the set of SSBs including a first subset of SSBs associated with a first TRP of the set of TRPs and a second subset of SSBs associated with a second TRP of the set of TRPs, each SSB of the set of SSBs corresponding to a respective directional beam. The operations of 1405 may be performed in accordance with examples as disclosed herein. In some examples, aspects of the operations of 1405 may be performed by an SSB component 725 as described with reference to FIG. 7.

At 1410, the method may include determining the first subset of SSBs associated with the first TRP of the set of TRPs and the second subset of SSBs associated with the second TRP of the set of TRPs based on a predefined rule. The operations of 1410 may be performed in accordance with examples as disclosed herein. In some examples, aspects of the operations of 1410 may be performed by an SSB component 725 as described with reference to FIG. 7.

At 1415, the method may include transmitting, to a base station, an indication of a selected first SSB from the first subset of SSBs associated with the first TRP and a selected second SSB from the second subset of SSBs associated with the second TRP. The operations of 1415 may be performed in accordance with examples as disclosed herein. In some examples, aspects of the operations of 1415 may be performed by a message component 730 as described with reference to FIG. 7.

At 1420, the method may include performing a random access channel procedure based on the transmitted indication. The operations of 1420 may be performed in accordance with examples as disclosed herein. In some examples, aspects of the operations of 1420 may be performed by a random access component 735 as described with reference to FIG. 7.

Figure 15:
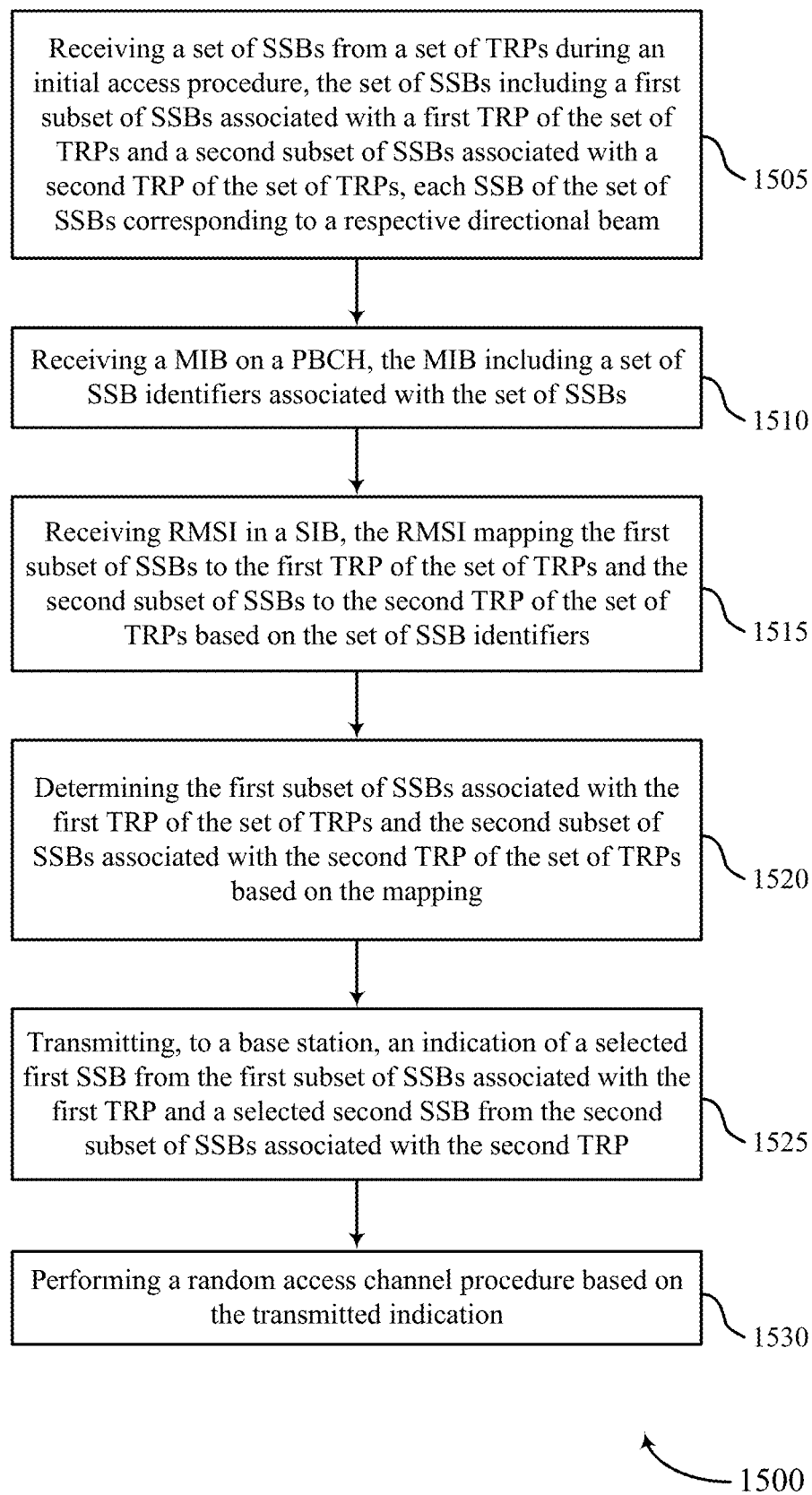

FIG. 15 shows a flowchart illustrating a method 1500 that supports a random access channel procedure for mTRPs in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a set of SSBs from a set of TRPs during an initial access procedure, the set of SSBs including a first subset of SSBs associated with a first TRP of the set of TRPs and a second subset of SSBs associated with a second TRP of the set of TRPs, each SSB of the set of SSBs corresponding to a respective directional beam. The operations of 1505 may be performed in accordance with examples as disclosed herein. In some examples, aspects of the operations of 1505 may be performed by an SSB component 725 as described with reference to FIG. 7.

At 1510, the method may include receiving a MIB on a PBCH, the MIB including a set of SSB identifiers associated with the set of SSBs. The operations of 1510 may be performed in accordance with examples as disclosed herein. In some examples, aspects of the operations of 1510 may be performed by a message component 730 as described with reference to FIG. 7.

At 1515, the method may include receiving RMSI in a SIB, the RMSI mapping the first subset of SSBs to the first TRP of the set of TRPs and the second subset of SSBs to the second TRP of the set of TRPs based on the set of SSB identifiers. The operations of 1515 may be performed in accordance with examples as disclosed herein. In some examples, aspects of the operations of 1515 may be performed by a message component 730 as described with reference to FIG. 7.

At 1520, the method may include determining the first subset of SSBs associated with the first TRP of the set of TRPs and the second subset of SSBs associated with the second TRP of the set of TRPs based on the mapping. The operations of 1520 may be performed in accordance with examples as disclosed herein. In some examples, aspects of the operations of 1520 may be performed by an SSB component 725 as described with reference to FIG. 7.

At 1525, the method may include transmitting, to a base station, an indication of a selected first SSB from the first subset of SSBs associated with the first TRP and a selected second SSB from the second subset of SSBs associated with the second TRP. The operations of 1525 may be performed in accordance with examples as disclosed herein. In some examples, aspects of the operations of 1525 may be performed by a message component 730 as described with reference to FIG. 7.

At 1530, the method may include performing a random access channel procedure based on the transmitted indication. The operations of 1530 may be performed in accordance with examples as disclosed herein. In some examples, aspects of the operations of 1530 may be performed by a random access component 735 as described with reference to FIG. 7.

Figure 16:
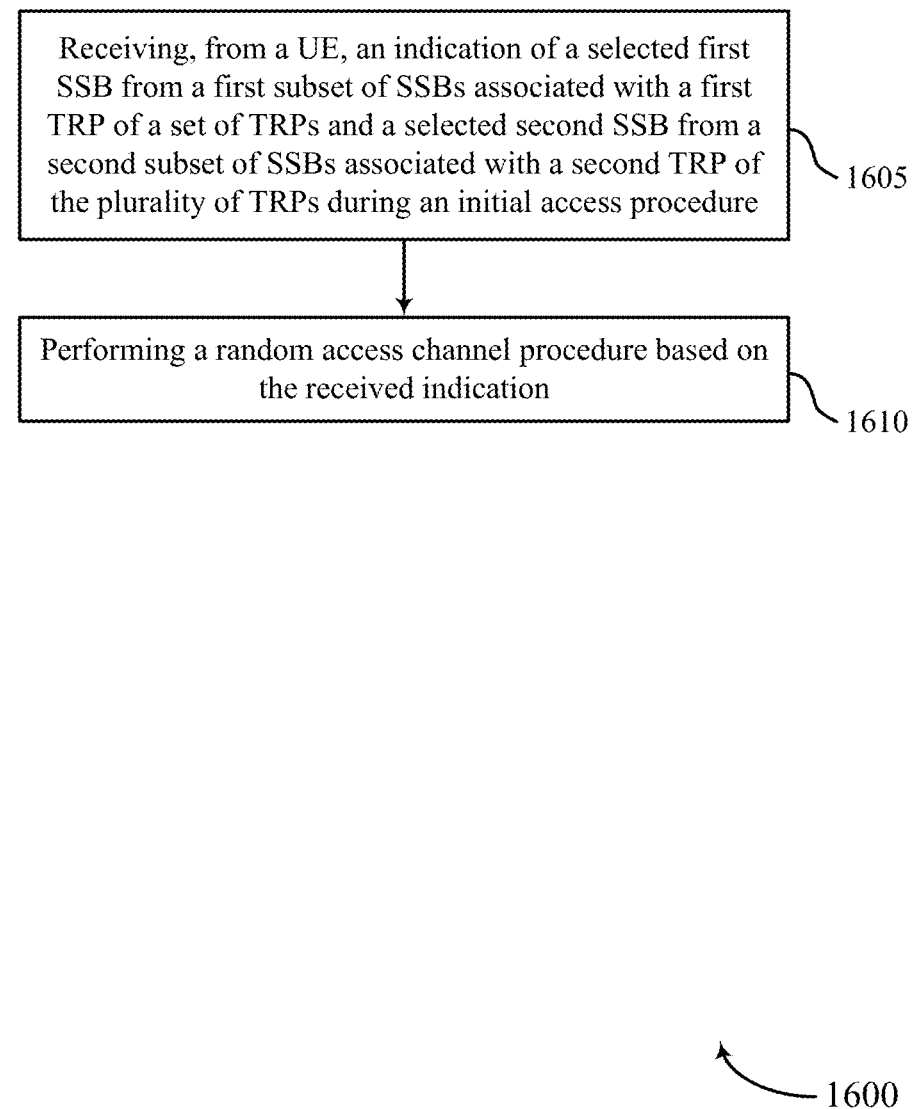

FIG. 16 shows a flowchart illustrating a method 1600 that supports a random access channel procedure for mTRPs in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, an indication of a selected first SSB from a first subset of SSBs associated with a first TRP of a set of TRPs and a selected second SSB from a second subset of SSBs associated with a second TRP of the set of TRPs during an initial access procedure. The operations of 1605 may be performed in accordance with examples as disclosed herein. In some examples, aspects of the operations of 1605 may be performed by an SSB component 1125 as described with reference to FIG. 11.

At 1610, the method may include performing a random access channel procedure based on the received indication. The operations of 1610 may be performed in accordance with examples as disclosed herein. In some examples, aspects of the operations of 1610 may be performed by a random access component 1130 as described with reference to FIG. 11.

The following provides an overview of aspects of the present disclosure:

Aspect 1: A method for wireless communication at a UE, comprising: receiving a set of SSBs from a plurality of TRPs during an initial access procedure, the set of SSBs comprising a first subset of SSBs associated with a first TRP of the plurality of TRPs and a second subset of SSBs associated with a second TRP of the plurality of TRPs, each SSB of the set of SSBs corresponding to a respective directional beam; transmitting, to a base station, an indication of a selected first SSB from the first subset of SSBs associated with the first TRP and a selected second SSB from the second subset of SSBs associated with the second TRP; and performing a random access channel procedure based at least in part on the transmitted indication.

Aspect 2: The method of aspect 1, further comprising: determining the first subset of SSBs associated with the first TRP of the plurality of TRPs and the second subset of SSBs associated with the second TRP of the plurality of TRPs based at least in part on a predefined rule.

Aspect 3: The method of any of aspects 1 through 2, further comprising: receiving a MIB on a PBCH, the MIB comprising a set of SSB identifiers associated with the set of SSBs; and determining the first subset of SSBs associated with the first TRP of the plurality of TRPs and the second subset of SSBs associated with the second TRP of the plurality of TRPs based at least in part on the set of SSB identifiers.

Aspect 4: The method of aspect 3, further comprising: receiving RMSI in a SIB, the RMSI mapping the first subset of SSBs to the first TRP of the plurality of TRPs and the second subset of SSBs to the second TRP of the plurality of TRPs based at least in part on the set of SSB identifiers, wherein determining the first subset of SSBs associated with the first TRP of the plurality of TRPs and the second subset of SSBs associated with the second TRP of the plurality of TRPs based at least in part on the mapping.

Aspect 5: The method of any of aspects 1 through 4, further comprising: measuring each SSB from the first subset of SSBs associated with the first TRP and each SSB from the second subset of SSBs associated with the second TRP, wherein the selected first SSB from the first subset of SSBs associated with the first TRP and the selected second SSB from the second subset of SSBs associated with the second TRP is based at least in part on the measuring.

Aspect 6: The method of any of aspects 1 through 5, further comprising: determining the first subset of SSBs associated with the first TRP of the plurality of TRPs and the second subset of SSBs associated with the second TRP of the plurality of TRPs based at least in part on a radio resource control configuration.

Aspect 7: The method of aspect 6, wherein the radio resource control configuration comprises a set of TCI states associated with a set of control resource set pool identifiers.

Aspect 8: The method of aspect 7, wherein the set of control resource set pool identifiers correspond to a set of TRP identifiers associated with the plurality of TRPs.

Aspect 9: The method of any of aspects 1 through 8, further comprising: transmitting, to the base station, a first random access channel message on a beam corresponding to the selected first SSB from the first subset of SSBs associated with the first TRP.

Aspect 10: The method of aspect 9, further comprising: transmitting, to the base station, a random access channel preamble of the first random access channel message on the beam corresponding to the selected first SSB from the first subset of SSBs associated with the first TRP.

Aspect 11: The method of any of aspects 9 through 10, further comprising: transmitting, to the base station, an uplink message the indication of the selected second SSB from the second subset of SSBs associated with the second TRP based at least in part on transmitting the first random access channel message.

Aspect 12: The method of aspect 11, wherein the uplink message comprising the indication of the selected second SSB is transmitted on the beam corresponding to the selected first SSB associated with the first TRP, the indication is encoded in a field of the uplink message.

Aspect 13: The method of any of aspects 11 through 12, wherein the uplink message comprises a third random access channel message or a fifth random access channel message.

Aspect 14: The method of any of aspects 9 through 13, further comprising: transmitting, to the base station, a dedicated random access channel preamble of the first random access channel message on a first beam corresponding to the selected first SSB from the first subset of SSBs associated with the first TRP and on a second beam corresponding to the selected second SSB from the second subset of SSBs associated with the second TRP using a plurality of directional beams associated with the set of SSBs.

Aspect 15: The method of aspect 14, further comprising: receiving, from the base station, a downlink control message on a PDCCH, the downlink control message comprising a TCI codepoint for the random access channel procedure, wherein transmitting the dedicated random access channel preamble of the first random access channel message the indication of the selected first SSB from the first subset of SSBs associated with the first TRP and the selected second SSB from the second subset of SSBs associated with the second TRP is based at least in part on the TCI codepoint.

Aspect 16: The method of aspect 15, wherein the TCI codepoint comprises a pair of TCI states for each TRP of the plurality of TRPs.

Aspect 17: The method of any of aspects 1 through 16, further comprising: receiving, from the base station, a downlink control message comprising a second indication to perform the wireless communication, wherein the wireless communication comprises a multi TRP wireless transmission to and from the first TRP and the second TRP.

Aspect 18: The method of aspect 17, wherein the downlink control message comprises a DCI message, a MAC-CE message, or a RRC message, or a combination thereof.

Aspect 19: The method of any of aspects 1 through 18, further comprising: enabling a timer based at least in part on the transmitted indication, wherein performing the wireless communication comprises: receiving or transmitting the wireless communication to and from the first TRP and the second TRP based at least in part on the timer lapsing.

Aspect 20: The method of any of aspects 1 through 19, wherein performing the wireless communication comprises: receiving or transmitting the wireless communication to and from the first TRP and the second TRP using a first respective directional beam associated with the selected first SSB from the first subset of SSBs associated with the first TRP, a second respective directional beam associated with the selected second SSB from the second subset of SSBs associated with the second TRP, or a respective directional beam associated with a first random access channel message transmitted to the base station, or a combination thereof.

Aspect 21: The method of any of aspects 1 through 20, wherein the wireless communication to or from the first TRP and the second TRP is frequency-division multiplexed based at least in part on an indication from the base station or a predefined rule, or both.

Aspect 22: The method of any of aspects 1 through 21, wherein the wireless communication to or from the first TRP and the second TRP is time-division multiplexed based at least in part on an indication from the base station or a predefined rule, or both.

Aspect 23: The method of any of aspects 1 through 22, wherein the wireless communication to or from the first TRP and the second TRP is spatial-division multiplexed based at least in part on an indication from the base station or a predefined rule, or both.

Aspect 24: The method of any of aspects 1 through 23, wherein the wireless communication comprises a first portion from the first TRP and a second portion from the second TRP, the first portion is different from the second portion or the first portion and the second portion are the same.

Aspect 25: The method of any of aspects 1 through 24, further comprising: transmitting, to the base station, a random access message on a selected respective directional beam based at least in part on a directional beam failure event.

Aspect 26: The method of aspect 25, further comprising: receiving, from the base station, a radio resource control configuration message comprising a second indication of a set of directional beams for the UE to use based at least in part on the directional beam failure event, wherein the set of directional beams correspond to the first subset of SSBs associated with the first TRP of the plurality of TRPs or the second subset of SSBs associated with the second TRP of the plurality of TRPs, or both.

Aspect 27: The method of aspect 26, further comprising: transmitting the random access message to the first TRP of the plurality of TRPs and the second TRP of the plurality of TRPs, wherein the random access message comprises a dedicated preamble for beam failure recovery of the UE.

Aspect 28: The method of any of aspects 26 through 27, further comprising: receiving a downlink message on a physical downlink control channel based at least in part on the transmitted random access message.

Aspect 29: A method for wireless communication at a base station, comprising: receiving, from a UE, an indication of a selected first SSB from a first subset of SSBs associated with a first TRP of a plurality of TRPs and a selected second SSB from a second subset of SSBs associated with a second TRP of the plurality of TRPs during an initial access procedure; and performing a random access channel procedure based at least in part on the received indication.

Aspect 30: The method of aspect 29, further comprising: transmitting a MIB on a PBCH, the MIB comprising a set of SSB identifiers associated with a set of SSBs, wherein the set of SSBs comprises the first subset of SSBs and the second subset of SSBs.

Aspect 31: The method of aspect 30, further comprising: transmitting RMSI in a SIB, the RMSI mapping the first subset of SSBs to the first TRP of the plurality of TRPs and the second subset of SSBs to the second TRP of the plurality of TRPs based at least in part on the set of SSB identifiers.

Aspect 32: The method of any of aspects 29 through 31, further comprising: transmitting a radio resource control configuration, wherein the radio resource control configuration comprises a set of TCI states associated with a set of control resource set pool identifiers.

Aspect 33: The method of aspect 32, wherein the set of control resource set pool identifiers correspond to a set of TRP identifiers associated with the plurality of TRPs.

Aspect 34: The method of any of aspects 29 through 33, further comprising: receiving a first random access channel message on a beam corresponding to the selected first SSB from the first subset of SSBs associated with the first TRP.

Aspect 35: The method of aspect 34, further comprising: receiving a random access channel preamble of the first random access channel message on the beam corresponding to the selected first SSB from the first subset of SSBs associated with the first TRP.

Aspect 36: The method of any of aspects 34 through 35, further comprising: receiving in an uplink message the indication of the selected second SSB from the second subset of SSBs associated with the second TRP based at least in part on receiving the first random access channel message.

Aspect 37: The method of aspect 36, wherein the uplink message comprising the indication of the selected second SSB is transmitted on the beam corresponding to the selected first SSB associated with the first TRP, the indication is encoded in a field of the uplink message.

Aspect 38: The method of any of aspects 36 through 37, wherein the uplink message comprises a third random access channel message or a fifth random access channel message.

Aspect 39: The method of any of aspects 34 through 38, further comprising: receiving a dedicated random access channel preamble of the first random access channel message on a first beam corresponding to the selected first SSB from the first subset of SSBs associated with the first TRP and on a second beam corresponding to the selected second SSB from the second subset of SSBs associated with the second TRP using a plurality of directional beams associated with a set of SSBs.

Aspect 40: The method of aspect 39, further comprising: transmitting a downlink control message on a physical downlink control channel, the downlink control message comprising a TCI codepoint for the random access channel procedure, wherein the TCI codepoint comprises a pair of TCI states for each TRP of the plurality of TRPs.

Aspect 41: The method of any of aspects 29 through 40, further comprising: transmitting a downlink control message comprising a second indication to perform the wireless communication, wherein the wireless communication comprises a multi TRP wireless transmission to and from the first TRP and the second TRP.

Aspect 42: The method of aspect 41, wherein the downlink control message comprises a DCI message, a MAC-CE message, or a RRC message, or a combination thereof.

Aspect 43: The method of any of aspects 41 through 42, further comprising: receiving a random access message on a selected respective directional beam based at least in part on a directional beam failure event.

Aspect 44: The method of aspect 43, further comprising: transmitting a radio resource control configuration message comprising a third indication of a set of directional beams for the UE to use based at least in part on the directional beam failure event, wherein the set of directional beams correspond to the first subset of SSBs associated with the first TRP of the plurality of TRPs or the second subset of SSBs associated with the second TRP of the plurality of TRPs, or both.

Aspect 45: The method of aspect 44, further comprising: receiving the content-free random access message to the first TRP of the plurality of TRPs and the second TRP of the plurality of TRPs.

Aspect 46: The method of any of aspects 44 through 45, further comprising: transmitting a downlink message on a physical downlink control channel based at least in part on the transmitted content-free random access message.

Aspect 47: An apparatus for wireless communication at a UE, comprising a processor; memory coupled with the processor; and instructions stored in the memory and executable by the processor to cause the apparatus to perform a method of any of aspects 1 through 28.

Aspect 48: An apparatus for wireless communication at a UE, comprising at least one means for performing a method of any of aspects 1 through 28.

Aspect 49: A non-transitory computer-readable medium storing code for wireless communication at a UE, the code comprising instructions executable by a processor to perform a method of any of aspects 1 through 28.

Aspect 50: An apparatus for wireless communication at a base station, comprising a processor; memory coupled with the processor; and instructions stored in the memory and executable by the processor to cause the apparatus to perform a method of any of aspects 29 through 46.

Aspect 51: An apparatus for wireless communication at a base station, comprising at least one means for performing a method of any of aspects 29 through 46.

Aspect 52: A non-transitory computer-readable medium storing code for wireless communication at a base station, the code comprising instructions executable by a processor to perform a method of any of aspects 29 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories storing processor-executable code; and
   one or more processors coupled with the one or more memories and individually or collectively operable to execute the code to cause the apparatus to:
   receive one or more messages comprising a set of synchronization signal block identifiers associated with a set of synchronization signal blocks;
   receive the set of synchronization signal blocks from a plurality of transmit-receive points during an initial access procedure, the set of synchronization signal blocks comprising a first subset of synchronization signal blocks associated with a first transmit-receive point of the plurality of transmit-receive points and a second subset of synchronization signal blocks associated with a second transmit-receive point of the plurality of transmit-receive points, each synchronization signal block of the set of synchronization signal blocks corresponding to a respective directional beam, the set of synchronization signal block identifiers indicative of the first subset and the second subset;

transmit, to a base station, an indication of a selected first synchronization signal block from the first subset of synchronization signal blocks associated with the first transmit-receive point and a selected second synchronization signal block from the second subset of synchronization signal blocks associated with the second transmit-receive point; and perform a random access channel procedure based at least in part on the transmitted indication.

2. The apparatus of claim 1, wherein the one or more processors are individually or collectively further operable to execute the code to cause the apparatus to:

determine the first subset of synchronization signal blocks associated with the first transmit-receive point of the plurality of transmit-receive points and the second subset of synchronization signal blocks associated with the second transmit-receive point of the plurality of transmit-receive points based at least in part on a predefined rule.

3. The apparatus of claim 1, wherein, to receive one or more messages comprising a set of synchronization signal block identifiers, the one or more processors are individually or collectively operable to execute the code to cause the apparatus to:

receive a master information block on a physical broadcast channel, the master information block comprising the set of synchronization signal block identifiers associated with the set of synchronization signal blocks; and determine the first subset of synchronization signal blocks associated with the first transmit-receive point of the plurality of transmit-receive points and the second subset of synchronization signal blocks associated with the second transmit-receive point of the plurality of transmit-receive points based at least in part on the set of synchronization signal block identifiers indicating the first subset and the second subset.

4. The apparatus of claim 3, wherein the one or more processors are individually or collectively further operable to execute the code to cause the apparatus to:

receive remaining minimum system information in a system information block, the remaining minimum system information mapping the first subset of synchronization signal blocks to the first transmit-receive point of the plurality of transmit-receive points and the second subset of synchronization signal blocks to the second transmit-receive point of the plurality of transmit-receive points based at least in part on the set of synchronization signal block identifiers, wherein to determine the first subset of synchronization signal blocks associated with the first transmit-receive point of the plurality of transmit-receive points and the second subset of synchronization signal blocks associated with the second transmit-receive point of the plurality of transmit-receive points is further based at least in part on the mapping.

5. The apparatus of claim 1, wherein the one or more processors are individually or collectively further operable to execute the code to cause the apparatus to:

measure each synchronization signal block from the first subset of synchronization signal blocks associated with the first transmit-receive point and each synchronization signal block from the second subset of synchronization signal blocks associated with the second transmit-receive point, wherein the selected first synchronization signal block from the first subset of synchronization signal blocks associated with the first transmit-receive point and the selected second synchronization signal block from the second subset of synchronization signal blocks associated with the second transmit-receive point is further based at least in part on the measuring.

6. The apparatus of claim 1, wherein the one or more processors are individually or collectively further operable to execute the code to cause the apparatus to:

determine the first subset of synchronization signal blocks associated with the first transmit-receive point of the plurality of transmit-receive points and the second subset of synchronization signal blocks associated with the second transmit-receive point of the plurality of transmit-receive points based at least in part on a radio resource control configuration, the radio resource control configuration comprising a set of transmission configuration indicator states associated with a set of control resource set pool identifiers, the set of control resource set pool identifiers corresponding to a set of transmit-receive point identifiers associated with the plurality of transmit-receive points.

7. The apparatus of claim 1, wherein the one or more processors are individually or collectively further operable to execute the code to cause the apparatus to:

transmit, to the base station, a first random access channel message on a beam corresponding to the selected first synchronization signal block from the first subset of synchronization signal blocks associated with the first transmit-receive point.

8. The apparatus of claim 7, wherein the one or more processors are individually or collectively further operable to execute the code to cause the apparatus to:

transmit, to the base station, a random access channel preamble of the first random access channel message on the beam corresponding to the selected first synchronization signal block from the first subset of synchronization signal blocks associated with the first transmit-receive point.

9. The apparatus of claim 7, wherein the one or more processors are individually or collectively further operable to execute the code to cause the apparatus to:

transmit, to the base station and based at least in part on transmitting the first random access channel message, an uplink message comprising one or more of the indication of the selected second synchronization signal block from the second subset of synchronization signal blocks associated with the second transmit-receive point, a third random access channel message, or a fifth random access channel message, wherein the uplink message comprising the indication of the selected second synchronization signal block is transmitted on the beam corresponding to the selected first synchronization signal block associated with the first transmit-receive point, and wherein the indication is encoded in a field of the uplink message.

10. The apparatus of claim 7, wherein the one or more processors are individually or collectively further operable to execute the code to cause the apparatus to:

transmit, to the base station, a dedicated random access channel preamble of the first random access channel message on a first beam corresponding to the selected first synchronization signal block from the first subset of synchronization signal blocks associated with the first transmit-receive point and on a second beam corresponding to the selected second synchronization signal block from the second subset of synchronization signal blocks associated with the second transmit-receive point using a plurality of directional beams associated with the set of synchronization signal blocks.

11. The apparatus of claim 10, wherein the one or more processors are individually or collectively further operable to execute the code to cause the apparatus to:
receive, from the base station, a downlink control message on a physical downlink control channel, the downlink control message comprising a transmission configuration indicator codepoint for the random access channel procedure, the transmission configuration indicator codepoint comprising a pair of transmission configuration indicator states for each transmit-receive point of the plurality of transmit-receive points,
wherein to transmit the dedicated random access channel preamble of the first random access channel message the indication of the selected first synchronization signal block from the first subset of synchronization signal blocks associated with the first transmit-receive point and the selected second synchronization signal block from the second subset of synchronization signal blocks associated with the second transmit-receive point is further based at least in part on the transmission configuration indicator codepoint.

12. The apparatus of claim 1, wherein the one or more processors are individually or collectively further operable to execute the code to cause the apparatus to:
receive, from the base station, a downlink control message comprising a second indication to perform the wireless communication, the downlink control message comprising one or more of a downlink control information message, a medium access control-control element message, or a radio resource control message,
wherein the wireless communication comprises a multi transmit-receive point wireless transmission to and from the first transmit-receive point and the second transmit-receive point.

13. The apparatus of claim 1, wherein the one or more processors are individually or collectively further operable to execute the code to cause the apparatus to:
enable a timer based at least in part on the transmitted indication, wherein, to perform the wireless communication, the one or more processors are individually or collectively operable to execute the code to cause the apparatus to:
receive or transmit the wireless communication to and from the first transmit-receive point and the second transmit-receive point based at least in part on the timer lapsing.

14. The apparatus of claim 1, wherein, to perform the wireless communication, the one or more processors are individually or collectively operable to execute the code to cause the apparatus to:
receive or transmit the wireless communication to and from the first transmit-receive point and the second transmit-receive point using a first respective directional beam associated with the selected first synchronization signal block from the first subset of synchronization signal blocks associated with the first transmit-receive point, one or both of a second respective directional beam associated with the selected second synchronization signal block from the second subset of synchronization signal blocks associated with the second transmit-receive point or a respective directional beam associated with a first random access channel message transmitted to the base station.

15. The apparatus of claim 1, wherein the wireless communication to or from the first transmit-receive point and the second transmit-receive point is frequency-division multiplexed, time-division multiplexed, or spatial-division multiplexed based at least in part on an indication from the base station or a predefined rule, or both.

16. The apparatus of claim 1, wherein the wireless communication comprises a first portion from the first transmit-receive point and a second portion from the second transmit-receive point, and wherein the first portion is different from the second portion or the first portion and the second portion are the same.

17. The apparatus of claim 1, wherein the one or more processors are individually or collectively further operable to execute the code to cause the apparatus to:
transmit, to the base station, a random access message on a selected respective directional beam based at least in part on a directional beam failure event; and
receive, from the base station, a radio resource control configuration message comprising a second indication of a set of directional beams for the UE to use based at least in part on the directional beam failure event,
wherein the set of directional beams correspond to the first subset of synchronization signal blocks associated with the first transmit-receive point of the plurality of transmit-receive points or the second subset of synchronization signal blocks associated with the second transmit-receive point of the plurality of transmit-receive points, or both.

18. The apparatus of claim 17, wherein the one or more processors are individually or collectively further operable to execute the code to cause the apparatus to:
transmit the random access message to the first transmit-receive point of the plurality of transmit-receive points and the second transmit-receive point of the plurality of transmit-receive points, wherein the random access message comprises a dedicated preamble for beam failure recovery of the UE; and
receive a downlink message on a physical downlink control channel based at least in part on the transmitted random access message.

19. An apparatus for wireless communication at a base station, comprising:
one or more memories storing processor-executable code; and
one or more processors coupled with the one or more memories and individually or collectively operable to execute the code to cause the apparatus to:
transmit one or more messages comprising a set of synchronization signal block identifiers associated with a set of synchronization signal blocks;
receive, from a user equipment (UE), an indication of a selected first synchronization signal block from a first subset of synchronization signal blocks associated with a first transmit-receive point of a plurality of transmit-receive points and a selected second synchronization signal block from a second subset of synchronization signal blocks associated with a second transmit-receive point of the plurality of transmit-receive points during an initial access procedure, the set of synchronization signal blocks comprising the first subset of synchronization signal blocks and the second subset of synchronization signal blocks, the set of synchronization signal block identifiers indicative of the first subset and the second subset; and perform a random access channel procedure based at least in part on the received indication.

20. The apparatus of claim 19 wherein, to transmit one or more messages comprising a set of synchronization signal block identifiers, the one or more processors are individually or collectively operable to execute the code to cause the apparatus to:
transmit a master information block on a physical broadcast channel, the master information block comprising the set of synchronization signal block identifiers associated with the set of synchronization signal blocks and indicating the first subset of synchronization signal blocks and the second subset of synchronization signal blocks.

21. The apparatus of claim 20, wherein the one or more processors are individually or collectively further operable to execute the code to cause the apparatus to:
transmit remaining minimum system information in a system information block, the remaining minimum system information mapping the first subset of synchronization signal blocks to the first transmit-receive point of the plurality of transmit-receive points and the second subset of synchronization signal blocks to the second transmit-receive point of the plurality of transmit-receive points based at least in part on the set of synchronization signal block identifiers.

22. The apparatus of claim 19, wherein the one or more processors are individually or collectively further operable to execute the code to cause the apparatus to:
transmit a radio resource control configuration, wherein the radio resource control configuration comprises a set of transmission configuration indicator states associated with a set of control resource set pool identifiers, the set of control resource set pool identifiers corresponding to a set of transmit-receive point identifiers associated with the plurality of transmit-receive points.

23. The apparatus of claim 19, wherein the one or more processors are individually or collectively further operable to execute the code to cause the apparatus to:
receive a first random access channel message on a beam corresponding to the selected first synchronization signal block from the first subset of synchronization signal blocks associated with the first transmit-receive point.

24. The apparatus of claim 23, wherein the one or more processors are individually or collectively further operable to execute the code to cause the apparatus to:
receive a random access channel preamble of the first random access channel message on the beam corresponding to the selected first synchronization signal block from the first subset of synchronization signal blocks associated with the first transmit-receive point.

25. The apparatus of claim 23, wherein the one or more processors are individually or collectively further operable to execute the code to cause the apparatus to:
receive an uplink message comprising the indication of the selected second synchronization signal block from the second subset of synchronization signal blocks associated with the second transmit-receive point based at least in part on receiving the first random access channel message.

26. The apparatus of claim 23, wherein the one or more processors are individually or collectively further operable to execute the code to cause the apparatus to:
receive a dedicated random access channel preamble of the first random access channel message on a first beam corresponding to the selected first synchronization signal block from the first subset of synchronization signal blocks associated with the first transmit-receive point and on a second beam corresponding to the selected second synchronization signal block from the second subset of synchronization signal blocks associated with the second transmit-receive point using a plurality of directional beams associated with the set of synchronization signal blocks.

27. The apparatus of claim 26, wherein the one or more processors are individually or collectively further operable to execute the code to cause the apparatus to:
transmit a downlink control message on a physical downlink control channel, the downlink control message comprising a transmission configuration indicator codepoint for the random access channel procedure, wherein the transmission configuration indicator codepoint comprises a pair of transmission configuration indicator states for each transmit-receive point of the plurality of transmit-receive points.

28. The apparatus of claim 19, wherein the one or more processors are individually or collectively further operable to execute the code to cause the apparatus to:
transmit a downlink control message comprising a second indication to perform the wireless communication, wherein the wireless communication comprises a multi transmit-receive point wireless transmission to and from the first transmit-receive point and the second transmit-receive point.

29. A method for wireless communications at a user equipment (UE), comprising:
receiving one or more messages comprising a set of synchronization signal block identifiers associated with a set of synchronization signal blocks;
receiving the set of synchronization signal blocks from a plurality of transmit-receive points during an initial access procedure, the set of synchronization signal blocks comprising a first subset of synchronization signal blocks associated with a first transmit-receive point of the plurality of transmit-receive points and a second subset of synchronization signal blocks associated with a second transmit-receive point of the plurality of transmit-receive points, each synchronization signal block of the set of synchronization signal blocks corresponding to a respective directional beam, the set of synchronization signal block identifiers indicative of the first subset and the second subset;
transmitting, to a base station, an indication of a selected first synchronization signal block from the first subset of synchronization signal blocks associated with the first transmit-receive point and a selected second synchronization signal block from the second subset of synchronization signal blocks associated with the second transmit-receive point; and
performing a random access channel procedure based at least in part on the transmitted indication.

30. A method for wireless communication at a base station, comprising:
transmitting one or more messages comprising a set of synchronization signal block identifiers associated with a set of synchronization signal blocks;
receiving, from a user equipment (UE), an indication of a selected first synchronization signal block from a first subset of synchronization signal blocks associated with a first transmit-receive point of a plurality of transmit-receive points and a selected second synchronization signal block from a second subset of synchronization signal blocks associated with a second transmit-receive point of the plurality of transmit-receive points during an initial access procedure, the set of synchronization signal blocks comprising the first subset of synchronization signal blocks and the second subset of synchronization signal blocks, the set of synchronization signal block identifiers indicative of the first subset and the second subset; and performing a random access channel procedure based at least in part on the received indication.

* * * * *